US012192961B2

(12) United States Patent
Liu et al.

(10) Patent No.: US 12,192,961 B2
(45) Date of Patent: Jan. 7, 2025

(54) RESOURCE CONFIGURATION METHOD, RESOURCE CONFIGURATION OBTAINING METHOD, INFORMATION SENDING METHOD, AND DEVICE

(71) Applicant: VIVO MOBILE COMMUNICATION CO., LTD., Guangdong (CN)

(72) Inventors: Siqi Liu, Chang'an Dongguan (CN); Zichao Ji, Chang'an Dongguan (CN); Yong Wang, Chang'an Dongguan (CN)

(73) Assignee: VIVO MOBILE COMMUNICATION CO.,LTD., Guangdong (CN)

( * ) Notice: Subject to any disclaimer, the term of this patent is extended or adjusted under 35 U.S.C. 154(b) by 416 days.

(21) Appl. No.: 17/490,986

(22) Filed: Sep. 30, 2021

(65) Prior Publication Data

US 2022/0022170 A1 Jan. 20, 2022

Related U.S. Application Data

(63) Continuation of application No. PCT/CN2020/082457, filed on Mar. 31, 2020.

(30) Foreign Application Priority Data

Apr. 2, 2019 (CN) .......................... 201910263128.X

(51) Int. Cl.
*H04W 56/00* (2009.01)
*H04W 72/02* (2009.01)
(Continued)

(52) U.S. Cl.
CPC ......... *H04W 72/02* (2013.01); *H04W 56/001* (2013.01); *H04W 72/0446* (2013.01); *H04W 72/0453* (2013.01)

(58) Field of Classification Search
None
See application file for complete search history.

(56) References Cited

U.S. PATENT DOCUMENTS

2019/0037430 A1 1/2019 Lee et al.
2019/0373617 A1 12/2019 Sun et al.
(Continued)

FOREIGN PATENT DOCUMENTS

CN 107734557 A 2/2018
CN 108289336 A 7/2018
(Continued)

OTHER PUBLICATIONS

InterDigital Inc. (3GPP TSG RAN WG1 Ad-Hoc Meeting 1901: R1-1900801)—Jan. 21-25, 2019 (Year: 2019).*
(Continued)

*Primary Examiner* — The Hy Nguyen
(74) *Attorney, Agent, or Firm* — Price Heneveld LLP

(57) ABSTRACT

This application provides a resource configuration method, a resource configuration obtaining method, an information sending method, and a device, which relates to the field of communications technologies. The resource configuration method is applied to a first terminal and includes: obtaining target configuration information; and determining sidelink resource configuration information based on the target configuration information.

18 Claims, 11 Drawing Sheets

(51) Int. Cl.
*H04W 72/0446* (2023.01)
*H04W 72/0453* (2023.01)

(56) References Cited

U.S. PATENT DOCUMENTS

| | | | |
|---|---|---|---|
| 2020/0068609 A1 | 2/2020 | Wang et al. | |
| 2020/0229114 A1* | 7/2020 | Ryu | H04L 27/26025 |
| 2021/0250934 A1* | 8/2021 | Zhao | H04W 72/20 |
| 2021/0320766 A1 | 10/2021 | Li | |
| 2022/0046598 A1* | 2/2022 | Zhao | H04W 48/12 |
| 2022/0191809 A1* | 6/2022 | Khoryaev | H04W 56/001 |
| 2022/0191862 A1* | 6/2022 | Hwang | H04W 4/40 |

FOREIGN PATENT DOCUMENTS

| | | | |
|---|---|---|---|
| CN | 108419294 A | 8/2018 | |
| CN | 108810906 A | 11/2018 | |
| CN | 109076478 A | 12/2018 | |
| CN | 109327906 A | 2/2019 | |
| WO | 2017160070 A1 | 9/2017 | |
| WO | 2017180258 A1 | 10/2017 | |
| WO | 2018059126 A1 | 4/2018 | |
| WO | 2018/149265 A1 | 8/2018 | |
| WO | WO-2018145628 A1 * | 8/2018 | H04W 4/40 |

OTHER PUBLICATIONS

Huawei et al., "Sidelink physical layer structure for NR V2X," 3GPP TSG RAN WG1 Ad-Hoc Meeting 1901, R1-1900022, pp. 1-12, (Jan. 21-25, 2019).
Huawei et al., "Frame and slot structure for sidelink," 3GPP TSG RAN WG1 Ad-Hoc Meeting 1901, R1-1900856, pp. 1-5, (Jan. 21-25, 2019).
Huawei., "Feature lead summary for AI 7.2.4.3: Uu-based sidelink resource allocation/configuration," 3GPP TSG RAN WG1 Meeting AH-1901, R1-1901393, pp. 1-11, (Jan. 21-25, 2019).
KR Office Action dated Jun. 15, 2023 as received in Application No. 10-2021-7035821.
ZTE, Discussion on NR Uu based resource allocation/configuration for LTE sidelink, R1-1810727, 3GPP TSG RAN WG1 Meeting #94bis, Chengdu, China, Oct. 8-12, 2018.
Oppo, Enhancement of LTE Uu and NR Uu to control NR sidelink, R1-1810987, 3GPP TSG RAN WG1 Meeting #94bis, Chengdu, China, Oct. 8-12, 2018.
Fujitsu, Resource Allocation for NR V2X Sidelink Communication, R1-1812410, 3GPP TSG RAN WG1 Meeting #95, Spokane, United States, Nov. 12-16, 2018.
Huawei, Hisilicon, Discussion on LTE Uu to control NR sidelink, R1-1813668, 3GPP TSG RAN WG1 Meeting #95, Spokane, USA, Nov. 12-16, 2018.
Chinese Office Action issued in corresponding application No. 201910263128.X, dated Dec. 20, 2021.
International Search Report and Written Opinion issued in corresponding application No. PCT/CN2020/082457, dated Jun. 29, 2020.
"Dicussion of Uu-based sidelink resource allocation and configuration" 3GPP TSG RAN WGI #96, OPPO, R1-1902388, Feb. 25, 2019.
EP Search Report in Application No. 20784024.0 Dated Apr. 26, 2022.
IN Office Action in Application No. 202127049837 Dated Mar. 29, 2022.
Oppo, "On NR Uu to control LTE sidelink", 3GPP TSG-RAN WG1 Meeting #94bis, R1-1810978, Chengdu, China, Oct. 8-12, 2018.
Huawei, Hisilicon, "Summary of AI: 7.2.4.3 Uu-based sidelink resource allocation/configuration", 3GPP TSG RAN WG1 Meeting #94bis, R1-1811995, Chengdu, China, Oct. 8-12, 2018.

* cited by examiner

| Configuration number | Specific configuration |
|---|---|
| 0 | D X U U U — Pattern |
| 1 | D X U U U D X U U U — Pattern 1 / Pattern 2 |
| 2 | D D X U U — Pattern |
| 3 | D D X U U D D X U U — Pattern 1 / Pattern 2 |
| 4 | D D D X U — Pattern |
| 5 | D D D X U D D D X U — Pattern 1 / Pattern 2 |
| 6 | D D D D D D X U U — Pattern |
| 7 | D X U U U D D D D — Pattern 1 / Pattern 2 |
| 8 | D D D D D D X U U — Pattern 1 / Pattern 2 |
| 9 | D D D D D D D X U — Pattern |
| 10 | D D D D D D D X U — Pattern 1 / Pattern 2 |
| 11 | D D D D D D D D X U — Pattern |
| 12 | D D D D D D D D X U — Pattern 1 / Pattern 2 |
| 13 | D D X U U — Pattern |
| 14 | D D X U U D D X U U — Pattern 1 / Pattern 2 |

FIG. 15

RESOURCE CONFIGURATION METHOD, RESOURCE CONFIGURATION OBTAINING METHOD, INFORMATION SENDING METHOD, AND DEVICE

CROSS-REFERENCE TO RELATED APPLICATIONS

This application is a continuation application of PCT International Application No. PCT/CN2020/082457 filed on Mar. 31, 2020, which claims priority to Chinese Patent Application No. 201910263128.X, filed in China on Apr. 2, 2019. The disclosures of these applications are incorporated herein by reference in their entireties.

TECHNICAL FIELD

This disclosure relates to the field of communications technologies, and in particular, to a resource configuration method, a resource configuration obtaining method, an information sending method, and a device.

BACKGROUND

There is no clear solution to how a sidelink terminal in new radio (NR) or long term evolution (LTE) determines available sidelink resources based on configurations of base stations using different radio access technologies or configurations of base stations using a same radio access technology, or other time division duplex (TDD) configurations, or other uplink-downlink configurations. Specifically, there is no clear solution to how an LTE sidelink terminal determines available sidelink resources based on a configuration of an NR base station, and how an NR sidelink terminal determines available sidelink resources based on a configuration of an LTE base station or a configuration of an NR base station, or other uplink-downlink configurations.

SUMMARY

According to a first aspect, some embodiments of this disclosure provide a resource configuration method, applied to a first terminal and including:
  obtaining target configuration information; and
  determining sidelink resource configuration information based on the target configuration information.

According to a second aspect, some embodiments of this disclosure provide an information sending method, applied to a target device, where the target device is a network-side device or a second terminal, and the method includes:
  sending target configuration information to a first terminal.

According to a third aspect, some embodiments of this disclosure provide a resource configuration obtaining method, applied to a third terminal and including:
  receiving sidelink resource configuration information sent by a first terminal.

According to a fourth aspect, some embodiments of this disclosure provide a terminal, where the terminal is a first terminal and includes:
  an obtaining module, configured to obtain target configuration information; and
  a determining module, configured to determine sidelink resource configuration information based on the target configuration information.

According to a fifth aspect, some embodiments of this disclosure provide a device, where the device is a target device, the target device is a network-side device or a second terminal, and the device includes:
  a sending module, configured to send target configuration information to a first terminal.

According to a sixth aspect, some embodiments of this disclosure provide a device, where the device is a target device, the target device is a network-side device or a second terminal, and the device includes a memory, a processor, and a program stored in the memory and capable of running on the processor, where when the program is executed by the processor, steps of the foregoing information sending method are implemented.

According to a seventh aspect, some embodiments of this disclosure provide a terminal, where the terminal is a third terminal and includes:
  a receiving module, configured to receive sidelink resource configuration information sent by a first terminal.

According to an eighth aspect, some embodiments of this disclosure provide a terminal, including a memory, a processor, and a program stored in the memory and capable of running on the processor, where when the program is executed by the processor, steps of the foregoing resource configuration method or steps of the foregoing resource configuration obtaining method are implemented.

According to a ninth aspect, some embodiments of this disclosure provide a computer-readable storage medium, where the computer-readable storage medium stores a computer program, and when the computer program is executed by a processor, steps of the foregoing resource configuration method, steps of the foregoing information sending method, or steps of the foregoing resource configuration obtaining method are implemented.

BRIEF DESCRIPTION OF DRAWINGS

To describe the technical solutions in the embodiments of this application or in the prior art more clearly, the following briefly describes the accompanying drawings for describing the embodiments or the prior art. Apparently, the accompanying drawings in the following description show merely some embodiments of this application, and a person of ordinary skill in the art may still derive other drawings from these accompanying drawings without creative efforts.

FIG. 15 presents an eleventh schematic configuration diagram of uplink-downlink configuration information, sidelink time domain configuration information, or sidelink time domain resource configuration information;

DESCRIPTION OF EMBODIMENTS

The following clearly describes the technical solutions in the embodiments of this disclosure with reference to the accompanying drawings in the embodiments of this disclosure. Apparently, the described embodiments are merely a part rather than all of the embodiments of this disclosure. All other embodiments that a person of ordinary skill in the art obtains without creative efforts based on the embodiments of this disclosure shall fall within the protection scope of this disclosure.

The terms "first", "second", and the like in this specification and claims of this application are used to distinguish between similar objects instead of describing a specific order or sequence. It should be understood that the data used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. In addition, the term "and/or" used in the specification and claims indicates at least one of connected objects. For example, "A and/or B" represents the following three cases: Only A exists, only B exists, and both A and B exist.

In the embodiments of this disclosure, terms such as "an example" or "for example" are used to represent an example, an instance, or an illustration. Any embodiment or design solution described as "an example" or "for example" in the embodiments of this disclosure shall not be interpreted to be more preferential or advantageous than other embodiments or design solutions. Specifically, the terms such as "an example" or "for example" are intended to present related concepts in a specific manner.

The following describes the embodiments of this disclosure with reference to the accompanying drawings. A resource configuration method, a resource configuration obtaining method, an information sending method, and a device provided in the embodiments of this disclosure may be applied to a wireless communications system. The wireless communications system may be a system that uses a 5th Generation (5G) mobile communications technology (hereinafter referred to as the 5G system). A person skilled in the art may understand that the 5G NR system is only an example and not a limitation.

Figure 1:
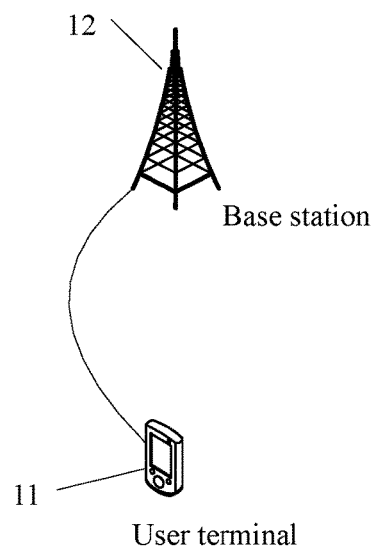
FIG. 1 presents a structural diagram of a network system to which some embodiments of this disclosure may be applied.

FIG. 1 is a structural diagram of a network system to which some embodiments of this disclosure may be applied. As shown in FIG. 1, the network system includes a user terminal 11 and a base station 12. The user terminal 11 may be user equipment (UE), for example, may be a terminal-side device such as a mobile phone, a tablet personal computer, a laptop computer, a personal digital assistant (PDA), a mobile Internet device (MID), or a wearable device. It should be noted that a specific type of the user terminal 11 is not limited in some embodiments of this disclosure. The base station 12 may be a base station (for example, a gNB or a 5G NR NB) in 5G or a later version, or a base station in another communications system, or is referred to as a NodeB. It should be noted that the 5G base station is merely used as an example in some embodiments of this disclosure, and not intended to limit a specific type of the base station 12.

Before some embodiments of this disclosure are described, some concepts mentioned in the following description are explained first.

Uplink-downlink configurations shown in Table 1 are supported in long term evolution (LTE) time division duplex (TDD).

TABLE 1

Uplink-downlink configurations supported in LTE TDD

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

An LTE sidelink (SL) reuses LTE uplink resources, that is, an LTE sidelink terminal performs sidelink transmission on the LTE uplink resources.

In new radio (NR) TDD, to adapt to more flexible and changeable service requirements, in addition to DL and UL symbols, an F (flexible) symbol is also defined for a more dynamic DL/UL configuration, and a base station may schedule the uplink transmission or downlink transmission on the F symbol.

Figure 2:
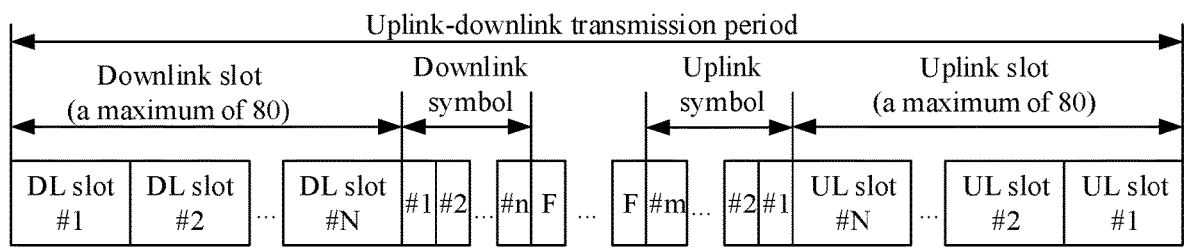
FIG. 2 presents a schematic diagram of an uplink-downlink (UL-DL) pattern.
Figure 3:
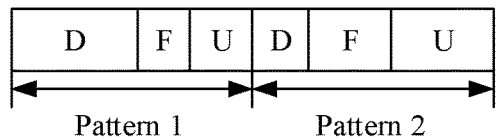
FIG. 3 presents a schematic diagram of a UL-DL configuration after two patterns are concatenated.

In an NR system information block 1 (SIB1), a more flexible manner is used to define a semi-static uplink/downlink (UL/DL) configuration in NR. The semi-static TDD UL/DL configuration in the SIB1 may include one or two UL-DL patterns, and the UL-DL patterns are shown in FIG. 2.

In addition to the semi-static UL/DL pattern, a dedicated UL/DL configuration is also defined in NR, and is carried by radio resource control (RRC). A semi-static UL/DL configuration of a terminal or some terminals may be modified.

A slot format indicator (SFI) is also defined in NR, and is used to control a UL/DL configuration on a symbol level. DCI 2-0 controls a UL/DL configuration in a corresponding slot by carrying an SFI index. The DCI 2-0 may carry one or more same or different SFI indexes at the same time.

A sidelink supports the following several scenarios:

1. An NR base station (a base station belonging to NR) controls an NR sidelink terminal: In this scenario, the NR base station may configure SL resources for the NR sidelink terminal.

2. An LTE base station (a base station belonging to LTE) controls an NR sidelink terminal: In this scenario, the LTE base station may configure SL resources for the NR sidelink terminal.

3. An NR base station controls an LTE sidelink terminal: In this scenario, the NR base station may configure SL resources for the LTE sidelink terminal.

4. An LTE base station controls an LTE sidelink terminal: In this scenario, the LTE base station may configure SL resources for the LTE sidelink terminal.

For the first three scenarios, there is no solution to how to infer available SL resources based on configurations of the base stations.

Whether an NR sidelink reuses UL resources, reuses F resources, or reuses F+UL resources is not determined.

In the foregoing scenario, the LTE or NR base station may send one or more SIBs to configure SL resources. For brevity, this SIB is referred to as an SL SIB in subsequent solution descriptions. The LTE or NR base station may further configure dedicated SL resources for a terminal in a connected state by using RRC signaling. For brevity, this RRC is referred to as SL RRC (this RRC and the foregoing RRC for modifying the UL/DL pattern are two pieces of different signaling) in the subsequent solution descriptions.

The NR sidelink terminal can transmit an S-SSB (sidelink synchronization signal block). The S-SSB includes a sidelink synchronization signal and a physical sidelink broadcast channel (PSBCH). The PSBCH is used to carry a sidelink master information block (MIB) (a possibility of sending a sidelink synchronization signal or a PSBCH alone is not excluded). The sidelink terminal can also use the S-SSB to carry information, or use a SIB or RRC transmitted on the sidelink to carry information. For brevity, the SIB or RRC transmitted on the sidelink is referred to as SL SI or SL RRC respectively.

For the scenario in which the long term evolution LTE base station controls the NR sidelink terminal, or the NR base station controls the LTE sidelink terminal, or the NR base station controls the NR sidelink terminal, designs of TDD uplink/downlink (UL/DL) configurations on the base station side and the terminal side may be different. For example, the LTE base station uses an LTE TDD configuration, while the NR sidelink terminal may use an NR UL/DL configuration. This makes the terminal unable to interpret the UL/DL configuration. In view of this problem, some embodiments of this disclosure provide a resource configuration method, a resource configuration obtaining method, an information sending method, and a device.

Figure 4:
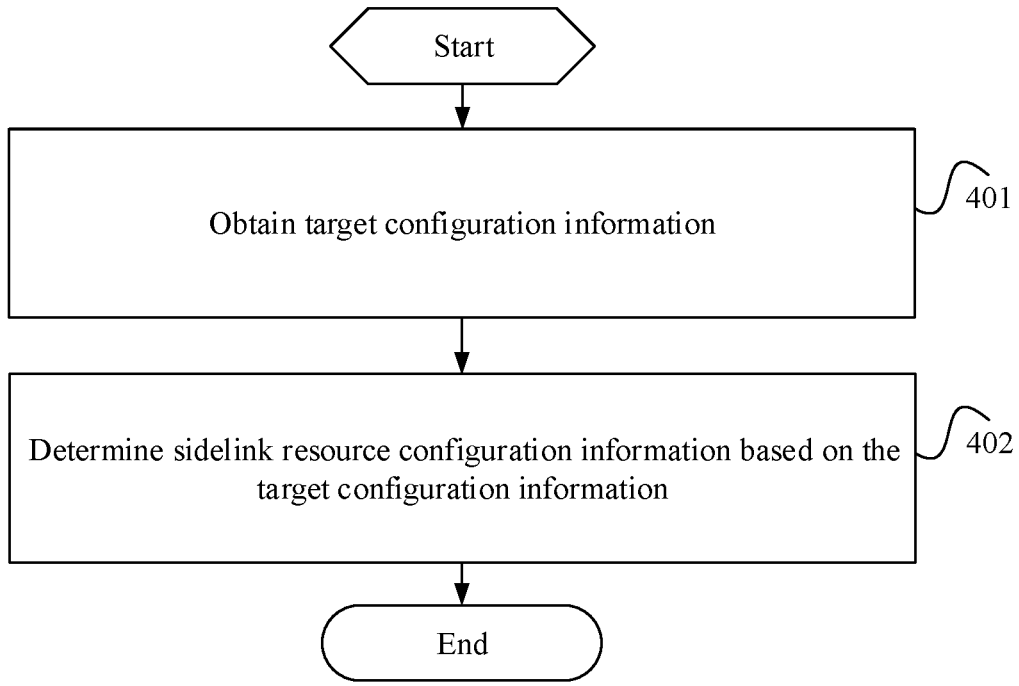
FIG. 4 presents a schematic flowchart of a resource configuration method according to some embodiments of this disclosure.

Specifically, FIG. 4 is a schematic flowchart of a resource configuration method according to some embodiments of this disclosure. The resource configuration method is applied to a first terminal and includes the following steps.

Step 401: Obtain target configuration information.

It should be noted that the target configuration information includes at least one of uplink-downlink configuration information, sidelink time domain configuration information, uplink bandwidth configuration information, sidelink bandwidth configuration information, sidelink synchronization resource information, or sidelink timing information.

Step 402: Determine sidelink resource configuration information based on the target configuration information.

It should be noted that the sidelink resource configuration information indicates a resource configuration used for sidelink transmission. Specifically, the sidelink transmission includes at least one of information sending and information receiving. The sidelink resource configuration information includes at least one of sidelink time domain resource configuration information, sidelink frequency domain resource configuration information, sidelink synchronization resource configuration information, or sidelink timing configuration information. It should be further noted that the uplink-downlink configuration information corresponds to the sidelink time domain configuration information and the sidelink time domain resource configuration information; the uplink bandwidth configuration information corresponds to the sidelink bandwidth configuration information and the sidelink frequency domain resource configuration information; the sidelink synchronization resource information corresponds to the sidelink synchronization resource configuration information; and the sidelink timing information corresponds to the sidelink timing configuration information. In other words, for example, when the target configuration information includes the uplink-downlink configuration information, the first terminal determines the sidelink time domain resource configuration information based on the uplink-downlink configuration information; when the target configuration information includes the sidelink time domain configuration information, the first terminal determines the sidelink time domain resource configuration information based on the sidelink time domain configuration information; when the target configuration information includes the uplink bandwidth configuration information, the first terminal determines the sidelink frequency domain resource configuration information based on the uplink bandwidth configuration information; when the target configuration information includes the sidelink bandwidth configuration information, the first terminal determines the sidelink frequency domain resource configuration information based on the sidelink bandwidth configuration information; when the target configuration information includes the sidelink synchronization resource information, the first terminal determines the sidelink synchronization resource configuration information based on the sidelink synchronization resource information; or when the target configuration information includes the sidelink timing information, the first terminal determines the sidelink timing configuration information based on the sidelink timing information. It should be noted that under normal circumstances, only the uplink-downlink configuration information or the sidelink time domain configuration information exists, and only the uplink bandwidth configuration information or the sidelink bandwidth configuration information exists. When the target configuration information includes one or more of the uplink-downlink configuration information, the sidelink time domain configuration information, the uplink bandwidth configuration information, the sidelink bandwidth configuration information, the sidelink synchronization resource information, and the sidelink timing information, the first terminal separately determines, based on the included information, the sidelink resource configuration information corresponding to the information.

It should be noted that a specific implementation of step 401 includes at least one of the following manners:

Manner 1: Obtaining target configuration information sent by a network-side device by using a second target message.

It should be noted that the second target message includes at least one of: a system information block (SIB) or radio resource control (RRC) signaling.

It should be further noted that the uplink-downlink configuration information, the sidelink time domain configuration information, the uplink bandwidth configuration information, and the sidelink bandwidth configuration information are sent by using at least one of a SIB, RRC signaling, a sidelink SIB, or sidelink RRC signaling. It should be noted that the sidelink SIB is a SIB dedicated for sidelink information transmission in SIBs; and the sidelink RRC signaling is RRC signaling dedicated for sidelink information transmission in RRC signaling. The sidelink synchronization resource information and the sidelink timing information are sent by using at least one of a sidelink SIB or sidelink RRC signaling.

Manner 2: Obtaining preconfigured target configuration information.

It should be noted that, in this case, the target configuration information is prestored in the terminal, and the terminal can directly obtain the target configuration information from the terminal.

Manner 3: Obtaining target configuration information indicated by a terminal other than the first terminal.

It should be noted that, in this case, the target configuration information is obtained from another terminal that directly communicates with the first terminal.

It should be noted that the target configuration information indicated by the other terminal may be carried in at least one of a physical sidelink broadcast channel (PSBCH) of the other terminal or sidelink higher layer signaling of the other terminal.

Manner 4: Obtaining target configuration information prescribed by a protocol.

It should be noted that, in this case, the target configuration information is prescribed by the communication protocol, and the terminal can directly determine and obtain the target configuration information based on the communication protocol.

It should be noted that the terminal may use one or more of the foregoing manners to obtain the target configuration information.

It should be noted that when the target configuration information includes the sidelink time domain configuration information, a bitmap may be directly provided in one or more of the foregoing manners. If a bit is 1, it indicates that a resource corresponding to the bit (for example, an OFDM symbol, a slot, a subframe, a frame, or a period) is usable for sidelink transmission; or if a bit is 0, it indicates that a resource corresponding to the bit (for example, an OFDM symbol, a slot, a subframe, a frame, or a period) cannot be used for sidelink transmission. Alternatively, if a bit is 0, it indicates that a resource corresponding to the bit (for example, an OFDM symbol, a slot, a subframe, a frame, or a period) is usable for sidelink transmission; or if a bit is 1, it indicates that a resource corresponding to the bit (for example, an OFDM symbol, a slot, a subframe, a frame, or a period) cannot be used for sidelink transmission. It should be noted that the sidelink transmission may be information receiving or information sending.

Specifically, when the first terminal obtains a plurality of pieces of target configuration information, step 402 may be performed in one of the following manners:

Manner 1: Determining the sidelink resource configuration information based on latest obtained target configuration information.

It should be noted that, for example, when the first terminal separately obtains the uplink-downlink configuration information in the target configuration information based on the SIB and the sidelink SIB sent by the network-side device, the first terminal uses the latest obtained target configuration information based on the obtaining time, to determine the sidelink time domain configuration information in the sidelink resource configuration information.

Manner 2: When at least two pieces of target configuration information are obtained, determining the sidelink resource configuration information based on at least a part of information in the at least two pieces of target configuration information.

It should be noted that a further implementation of this manner includes one piece of the following information:

Manner 1: Determining the sidelink resource configuration information based on at least a part of resources in a union set of resources in the at least two pieces of target configuration information.

It should be noted that the union set of resources includes time domain resources usable for sidelink transmission in the at least two pieces of target configuration information.

For example, the first terminal selects one of the at least two pieces of target configuration information to determine the sidelink resource configuration information.

In this case, for example, when the first terminal separately obtains uplink-downlink configuration information indicated by the sidelink RRC signaling and the RRC signaling, the first terminal uses the uplink-downlink configuration information indicated by the sidelink RRC signaling to determine the sidelink time domain resource configuration information in the sidelink resource configuration information; or when the first terminal separately obtains uplink-downlink configuration information indicated by the sidelink SIB and the SIB1, the first terminal uses the uplink-downlink configuration information indicated by the sidelink SIB to determine the sidelink time domain resource configuration information in the sidelink resource configuration information; or when the first terminal separately obtains uplink-downlink configuration information indicated by the sidelink SIB and the sidelink RRC signaling, the first terminal uses the uplink-downlink configuration information indicated by the sidelink RRC signaling to determine the sidelink time domain resource configuration information in the sidelink resource configuration information; or when the first terminal separately obtains uplink-downlink configuration information indicated by the sidelink SIB and preconfigured uplink-downlink configuration information, the first terminal uses the uplink-downlink configuration information indicated by the sidelink SIB to determine the sidelink time domain resource configuration information in the sidelink resource configuration information.

For example, the first terminal selects a part of resources in the union set of resources in the at least two pieces of target configuration information (that is, a subset of the union set of resources) to determine the sidelink resource configuration information.

For example, the first terminal selects all resources in the union set of resources in the at least two pieces of target configuration information to determine the sidelink resource configuration information.

Manner 2: Determining the sidelink resource configuration information based on first information in the at least two pieces of target configuration information.

It should be noted that the first information is a piece of target configuration information that meets a preset condition in the at least two pieces of target configuration information; and the preset condition includes: time domain resources usable for sidelink transmission are most, or time domain resources usable for sidelink transmission are fewest.

For example, the first terminal selects a piece of target configuration information with most time domain resources usable for sidelink transmission in the at least two pieces of target configuration information to determine the sidelink resource configuration information; or the first terminal selects a piece of target configuration information with fewest time domain resources usable for sidelink transmission in the at least two pieces of target configuration information to determine the sidelink resource configuration information.

It should be noted that, after determining that the sidelink resource configuration information is obtained, the first terminal may send the sidelink resource configuration information to other terminals, or may not send the sidelink resource configuration information.

Specifically, if the terminal sends the sidelink resource configuration information, a specific implementation is:
the first terminal may further send the sidelink resource configuration information in a first target message.

It should be noted that the first target message includes at least one of a physical sidelink broadcast channel (PSBCH), a sidelink system information block (SIB), or sidelink radio resource control (RRC) signaling.

Further, it should be noted that, after step 402, the method further includes:
indicating auxiliary information about the sidelink resource configuration information.

Further, the auxiliary information is used to indicate at least one of the following information:

A11. A manner of interpreting the sidelink resource configuration information.

It should be noted that the interpreting manner is to interpret the sidelink resource configuration information based on attribute information, or interpret the sidelink resource configuration information based on a configuration identifier. It should be noted that each of the attribute information and the configuration identifier corresponds to the target configuration information.

For example, if an NR sidelink terminal determines obtained sidelink time domain resource configuration information from uplink-downlink configuration information obtained from an LTE network-side device, the sidelink time domain resource configuration information is interpreted based on a configuration identifier; or if an NR sidelink terminal determines obtained sidelink time domain resource configuration information from uplink-downlink configuration information obtained from an NR network-side device, the sidelink time domain resource configuration information is interpreted based on attribute information.

A12. Type information of a target network-side device based on which sidelink time domain resource configuration information is obtained.

It should be noted that the type information of the target network-side device indicates whether the target network-side device is an NR network-side device or an LTE network-side device.

A13. Information about a synchronization source of the first terminal.

It should be noted that the synchronization source refers to an NR network-side device or an LTE network-side device.

A14. A type of the target configuration information based on which the sidelink time domain resource configuration information is obtained.

It should be noted that, in this case, the type of the target configuration information is uplink-downlink configuration information.

Specifically, an indication manner of the auxiliary information includes at least one of an explicit indication manner or an implicit indication manner.

The explicit indication manner is: using a preset bit for indication.

It should be noted that one bit may be used for indication. For example, when the auxiliary information is only used to indicate information about the synchronization source of the first terminal, when the bit is 0, it indicates that the synchronization source of the first terminal is an LTE network-side device, or when the bit is 1, it indicates that the synchronization source of the first terminal is an NR network-side device; or when the auxiliary information is used to indicate information about the synchronization source of the first terminal and the type information of the target network-side device based on which the sidelink time domain resource configuration information is obtained, when the bit is 0, it indicates that the synchronization source of the first terminal is an LTE network-side device, and that the target network-side device based on which the sidelink time domain resource configuration information is obtained is an LTE network-side device, or when the bit is 1, it indicates that the synchronization source of the first terminal is an NR network-side device, and that the target network-side device based on which the sidelink time domain resource configuration information is obtained is an NR network-side device.

For example, when the auxiliary information is only used to indicate information about the synchronization source of the first terminal, when the bit is 1, it indicates that the synchronization source of the first terminal is an LTE network-side device, or when the bit is 0, it indicates that the synchronization source of the first terminal is an NR network-side device; or when the auxiliary information is used to indicate information about the synchronization source of the first terminal and the type information of the target network-side device based on which the sidelink time domain resource configuration information is obtained, when the bit is 1, it indicates that the synchronization source of the first terminal is an LTE network-side device, and that the target network-side device based on which the sidelink time domain resource configuration information is obtained is an LTE network-side device, or when the bit is 0, it indicates that the synchronization source of the first terminal is an NR network-side device, and that the target network-side device based on which the sidelink time domain resource configuration information is obtained is an NR network-side device.

The implicit indication manner is: using different synchronization signals or reference signals to indicate the sidelink time domain resource configuration information. It should be noted that when different synchronization signals or reference signals are used to indicate the sidelink time domain resource configuration information, which type of information in the auxiliary information is specifically indicated can be inferred based on a used synchronization signal or reference signal.

For example, when determining the sidelink resource configuration information based on the information obtained from the LTE network-side device and determining the sidelink resource configuration information based on the information obtained from the NR network-side device, the sidelink terminal sends different sequences, and which manner should be used to interpret the sidelink resource configuration information can be known based on the different sequences.

It should be further noted herein that if a sidelink terminal selects another sidelink terminal (which may be an LTE sidelink terminal or an NR sidelink terminal) as a synchronization source, and obtains sidelink resource configuration information from a PSBCH of the another sidelink terminal, the sidelink terminal sets the sidelink resource configuration information on its own PSBCH to be the same as the sidelink resource configuration information obtained from the another sidelink terminal.

It should be noted that when the first terminal determines the sidelink time domain resource configuration information, because the target configuration information is different, a determining manner of the first terminal is also different.

From a perspective of different target configuration information, a specific implementation of step 402 of determining the sidelink time domain resource configuration information is hereinafter described.

1. The target configuration information includes the uplink-downlink configuration information.

Specifically, the specific implementation of step 402 is:
determining the sidelink time domain resource configuration information based on at least a part of resources that are indicated by the uplink-downlink configuration information and are usable for sidelink transmission.

It should be noted that herein the resources usable for sidelink transmission may be resources that are directly indicated in the uplink-downlink configuration information and are usable for sidelink transmission, or may be resources that are usable for sidelink transmission and are inferred based on resources that are indicated in the uplink-downlink configuration information and cannot be used for sidelink transmission.

It should be noted that the foregoing manner of determining the sidelink time domain resource configuration information may be subdivided into the following implementations:

A21. When only uplink resources are usable for sidelink transmission, determining the sidelink time domain resource configuration information based on at least a part of uplink resources in the uplink-downlink configuration information;

for example, determining the sidelink time domain resource configuration information based on a part of the uplink resources in the uplink-downlink configuration information; or determining the sidelink time domain resource configuration information based on all of the uplink resources in the uplink-downlink configuration information.

A22. When only flexible resources are usable for sidelink transmission, determining the sidelink time domain resource configuration information based on at least a part of flexible resources in the uplink-downlink configuration information, for example, determining the sidelink time domain resource configuration information based on a part of the flexible resources in the uplink-downlink configuration information; or determining the sidelink time domain resource configuration information based on all of the flexible resources in the uplink-downlink configuration information.

A23. When uplink resources and flexible resources are usable for sidelink transmission, determining the sidelink time domain resource configuration information based on at least a part of uplink resources and flexible resources in the uplink-downlink configuration information, for example, determining the sidelink time domain resource configuration information based on only a part of the uplink resources in the uplink-downlink configuration information; determining the sidelink time domain resource configuration information based on only a part of the flexible resources in the uplink-downlink configuration information; determining the sidelink time domain resource configuration information based on only a part of the uplink resources and a part of the flexible resources in the uplink-downlink configuration information; or determining the sidelink time domain resource configuration information based on all of the uplink resources and the flexible resources in the uplink-downlink configuration information.

A24. When uplink resources, flexible resources, and downlink resources can all be used for sidelink transmission, determining the sidelink time domain resource configuration information based on at least a part of uplink resources, flexible resources, and downlink resources in the uplink-downlink configuration information, for example, determining the sidelink time domain resource configuration information based on only a part of the uplink resources in the uplink-downlink configuration information; determining the sidelink time domain resource configuration information based on only a part of the flexible resources in the uplink-downlink configuration information; determining the sidelink time domain resource configuration information based on only a part of the downlink resources in the uplink-downlink configuration information; determining the sidelink time domain resource configuration information based on a part of the uplink resources and a part of the flexible resources in the uplink-downlink configuration information; determining the sidelink time domain resource configuration information based on a part of the uplink resources and a part of the downlink resources in the uplink-downlink configuration information; determining the sidelink time domain resource configuration information based on a part of the flexible resources and a part of the downlink resources in the uplink-downlink configuration information; determining the sidelink time domain resource configuration information based on a part of the flexible resources, a part of the downlink resources, and a part of the uplink resources in the uplink-downlink configuration information; or determining the sidelink time domain resource configuration information based on all of the uplink resources, the downlink resources, and the flexible resources in the uplink-downlink configuration information.

A25. When only downlink resources are usable for sidelink transmission, determining the sidelink time domain resource configuration information based on at least a part of downlink resources in the uplink-downlink configuration information, for example, determining the sidelink time domain resource configuration information based on a part of the downlink resources in the uplink-downlink configuration information; or determining the sidelink time domain resource configuration information based on all of the downlink resources in the uplink-downlink configuration information.

A26. When downlink resources and flexible resources are usable for sidelink transmission, determining the sidelink time domain resource configuration information based on at least a part of downlink resources and flexible resources in the uplink-downlink configuration information, for example, determining the sidelink time domain resource configuration information based on only a part of the downlink resources in the uplink-downlink configuration information; determining the sidelink time domain resource configuration information based on only a part of the flexible resources in the uplink-downlink configuration information; determining the sidelink time domain resource configuration information based on only a part of the downlink resources and a part of the flexible resources in the uplink-downlink configuration information; or determining the sidelink time domain resource configuration information based on all of the downlink resources and the flexible resources in the uplink-downlink configuration information.

2. The target configuration information includes the sidelink time domain configuration information.

Specifically, the specific implementation of step 402 is: determining the sidelink time domain resource configuration information based on at least a part of resources in the sidelink time domain configuration information, for example, determining the sidelink time domain resource configuration information based on a part of resources in the sidelink time domain configuration information; or determining the sidelink time domain resource configuration information based on all resources in the sidelink time domain configuration information.

It should be further noted that when the target configuration information includes the uplink-downlink configuration information or the sidelink time domain configuration information, the first terminal may obtain the target configuration information in the following manner:

A31. Obtaining the target configuration information based on identification information corresponding to the target configuration information, for example, obtaining the uplink-downlink configuration information based on identification information corresponding to the uplink-downlink configuration information; or obtaining the sidelink time domain configuration information based on identification information corresponding to the sidelink time domain configuration information.

It should be noted that, for example, each piece of identification information corresponds to a piece of uplink-downlink configuration information (or sidelink time domain configuration information). For example, some frequently used NR uplink-downlink configurations are selected for numbering, and the uplink-downlink configuration information is indicated by the number. For example, one uplink-downlink configuration (or sidelink time domain configuration) corresponds to a plurality of pieces of identification information, and uplink-downlink configuration information (or sidelink time domain configuration information) corresponding to the plurality of pieces of identification information is concatenated to form final uplink-downlink configuration information (or sidelink time domain configuration information).

A32. Obtaining the target configuration information based on attribute information of the target configuration information, for example, obtaining the uplink-downlink configuration information based on attribute information corresponding to the uplink-downlink configuration information; or obtaining the sidelink time domain configuration information based on attribute information corresponding to the sidelink time domain configuration information.

It should be further noted that the attribute information includes at least one of the following information:

A41. A period.

It should be noted that the period is a period corresponding to the uplink-downlink configuration information or the sidelink time domain configuration information. The period may include only one uplink-downlink pattern, or may include a plurality of uplink-downlink patterns.

It should be further noted that a plurality of parameters may be used to indicate a plurality of periods, or one parameter may be used to indicate a combination of a plurality of periods jointly.

A42. Indication information of downlink resources.

It should be noted that the indication information includes at least one of the number of resources or a resource bitmap. To be specific, the indication information of the downlink resources includes at least one of the number of resources of the downlink resources or a resource bitmap of the downlink resources. For example, when the indication information includes a plurality of resources, the resource bitmap manner may occupy more bits. In this case, the resources may be divided into a plurality of groups, different groups are indicated by resource bitmaps with the same number of bits, and the number of groups that have downlink resources is also indicated.

It should be further noted that if the number of resources is provided by an LTE network-side device, the number of resources may be at least one of the number of frames or the number of subframes; or if the number of resources is provided by an NR network-side device, the number of resources may be at least one of following items: the number of orthogonal frequency division multiplexing (OFDM) symbols, the number of slots, the number of frames, and the number of subframes.

A43. Indication information of uplink resources.

It should be noted that the indication information includes at least one of the number of resources or a resource bitmap. To be specific, the indication information of the uplink resources includes at least one of the number of resources of the uplink resources or a resource bitmap of the uplink resources.

A44. Indication information of flexible resources.

It should be noted that the indication information includes at least one of the number of resources or a resource bitmap. To be specific, the indication information of the flexible resources includes at least one of the number of resources of the flexible resources, or a resource bitmap of the flexible resources.

A45. Indication information of uplink resources and flexible resources.

It should be noted that the indication information includes at least one of the number of resources or a resource bitmap. To be specific, the indication information of the uplink resources and the flexible resources includes at least one of the number of resources of the uplink resources and the flexible resources, or a resource bitmap of the uplink resources and the flexible resources.

A46. Indication information of downlink resources and flexible resources.

It should be noted that the indication information includes at least one of the number of resources or a resource bitmap. To be specific, the indication information of the downlink resources and the flexible resources includes at least one of the number of resources of the downlink resources and the flexible resources, or a resource bitmap of the downlink resources and the flexible resources.

A47. Indication information of sidelink resources.

It should be noted that the indication information includes at least one of the number of resources or a resource bitmap. To be specific, the indication information of the sidelink resources includes at least one of the number of resources of the sidelink resources or a resource bitmap of the sidelink resources.

A48. A numerical configuration.

It should be noted that the numerical configuration includes at least one of a subcarrier spacing (SCS) or a cyclic prefix (CP) type.

It should be noted that if the target configuration information includes the uplink-downlink configuration information, the attribute information generally includes at least one of A41 to A46 and A48. If the target configuration information includes the sidelink time domain configuration information, the attribute information generally includes at least one of A41 to A48.

It should be further noted that, in this case, before step 402, the method further includes:

obtaining time offset information, where
the time offset information includes at least one of a time offset of a resource configured in the target configuration information or a time offset in the sidelink time domain resource configuration information.

It should be noted that the time offset of the resource configured in the target configuration information is a time offset used for determining the target configuration information. For example, the resource configured in the target configuration information starts to be configured from a symbol that is offset by a preset number. The time offset in the sidelink time domain resource configuration information is a time offset used for determining the sidelink time domain resource configuration information. The resource configured in the sidelink time domain resource configuration information starts to be configured from a symbol that is offset by a preset number.

In other words, in this case, the time offset information includes at least one of the time offset of the resource configured in the uplink-downlink configuration information or the time offset in the sidelink time domain resource configuration information. A manner of obtaining the time offset information includes one of the following manners:

A51. indicated by a network-side device;
A52. indicated by other terminals than the first terminal;
A53. prescribed by a protocol; and
A54. preconfigured.

It should further be noted that the first terminal may further send the time offset information to the other terminals, that is, provide the time offset information for the other terminals.

It should be noted that after the first terminal obtains the uplink-downlink configuration information or the sidelink time domain configuration information, a manner of indicating the sidelink time domain resource configuration information determined or obtained based on the uplink-downlink configuration information or the sidelink time domain configuration information may include at least one of the following manners:

A61. Sending a configuration identifier corresponding to the sidelink time domain resource configuration information.

It should be noted that the configuration identifier and the foregoing identification information are the same, and are both used to identify the uplink-downlink configuration information or the sidelink time domain configuration information.

A62. Sending attribute information corresponding to the sidelink time domain resource configuration information.

It should be noted that a manner of obtaining the uplink-downlink configuration information or the sidelink time domain configuration information and a manner of indicating the sidelink time domain resource configuration information may be the same or different.

The following uses the uplink-downlink configuration information as an example to describe the information indication manner:

for example, using the identification information corresponding to the uplink-downlink configuration information to obtain the uplink-downlink configuration information, and using the configuration identifier corresponding to the sidelink time domain resource configuration information to indicate the sidelink time domain resource configuration information; using the identification information corresponding to the uplink-downlink configuration information to obtain the uplink-downlink configuration information, and using the attribute information corresponding to the sidelink time domain resource configuration information to indicate the sidelink time domain resource configuration information; using the attribute information corresponding to the uplink-downlink configuration information to obtain the uplink-downlink configuration information, and using the configuration identifier corresponding to the sidelink time domain resource configuration information to indicate the sidelink time domain resource configuration information; using the attribute information corresponding to the uplink-downlink configuration information to obtain the uplink-downlink configuration information, and using the attribute information corresponding to the sidelink time domain resource configuration information to indicate the sidelink time domain resource configuration information; and using the identification information and attribute information corresponding to the uplink-downlink configuration information to obtain the uplink-downlink configuration information, and using the configuration identifier and attribute information corresponding to the sidelink time domain resource configuration information to indicate the sidelink time domain resource configuration information.

It should be further noted that the LTE sidelink terminal indicates the sidelink time domain resource configuration information preferentially in the manner of using the configuration identifier corresponding to the sidelink time domain resource configuration information; the NR sidelink terminal indicates the sidelink time domain resource configuration information preferentially in the manner of using the attribute information corresponding to the sidelink time domain resource configuration information; when performing a configuration for the NR sidelink terminal, the LTE network-side device indicates the uplink-downlink configuration information preferentially in the manner of using the attribute information corresponding to the uplink-downlink configuration information in corresponding signaling such as an SL SIB or SL RRC; and when performing a configuration for the LTE sidelink terminal, the NR network-side device indicates the uplink-downlink configuration information preferentially by using the identification information corresponding to the uplink-downlink configuration information in corresponding signaling such as an SL SIB or SL RRC.

The following describes in detail several cases in which the network-side device provides the uplink-downlink configuration information.

1. The NR network-side device provides the uplink-downlink configuration information.

In this case, the NR network-side device provides an NR sidelink service. Specifically, several configuration manners of the uplink-downlink configuration information include at least one of the following manners:

A SIB1 broadcast by the NR network-side device carries the uplink-downlink configuration information;

the NR network-side device configures dedicated uplink-downlink configuration information in RRC signaling for the NR sidelink terminal;

a sidelink SIB used for an NR sidelink and broadcast by the NR network-side device carries the uplink-downlink configuration information; and SL RRC configured by the NR network-side device for the NR sidelink terminal carries the uplink-downlink configuration information.

If the NR sidelink terminal obtains the uplink-downlink configuration information from the NR network-side device, the NR sidelink terminal determines the sidelink time domain resource configuration information based on the uplink-downlink configuration information.

2. The LTE network-side device provides the uplink-downlink configuration information.

In this case, the LTE network-side device provides an NR sidelink service. Specifically, several configuration manners of the uplink-downlink configuration information include at least one of the following manners:

A SIB1 broadcast by the LTE network-side device carries the uplink-downlink configuration information;

the LTE network-side device configures dedicated uplink-downlink configuration information in RRC signaling for the NR sidelink terminal;

a sidelink SIB used for an NR sidelink and broadcast by the LTE network-side device carries the uplink-downlink configuration information; and sidelink RRC configured by the LTE network-side device for the NR sidelink terminal carries the uplink-downlink configuration information.

If the NR sidelink terminal obtains the uplink-downlink configuration information from the LTE network-side device, the NR sidelink terminal determines the sidelink time domain resource configuration information based on the uplink-downlink configuration information.

3. The NR network-side device provides the uplink-downlink configuration information.

In this case, the NR network-side device provides an LTE sidelink service. Specifically, several configuration manners of the uplink-downlink configuration information include at least one of the following manners:

A SIB1 broadcast by the NR network-side device carries the uplink-downlink configuration information;

the NR network-side device configures dedicated uplink-downlink configuration information in RRC signaling for the LTE sidelink terminal;

a sidelink SIB used for an LTE sidelink and broadcast by the NR network-side device carries the uplink-downlink configuration information; and sidelink RRC configured by the NR network-side device for the LTE sidelink terminal carries the uplink-downlink configuration information.

If the LTE sidelink terminal obtains the uplink-downlink configuration information from the NR network-side device, the LTE sidelink terminal determines the sidelink time domain resource configuration information based on the uplink-downlink configuration information.

3. The target configuration information includes the uplink bandwidth configuration information or the sidelink bandwidth configuration information.

It should be noted that, in this case, an uplink bandwidth in the uplink bandwidth configuration information may be a bandwidth of a bandwidth part (BWP) or a bandwidth of an uplink carrier; and a sidelink bandwidth in the sidelink bandwidth configuration information may be a bandwidth of a sidelink BWP, or may be a bandwidth of a sidelink carrier, or may be a bandwidth of a sidelink resource pool.

It should be noted that, in this case, the first terminal determines the sidelink frequency domain resource configuration information based on the uplink bandwidth configuration information or the sidelink bandwidth configuration information, and a specific implementation is:

determining the sidelink frequency domain resource configuration information based on at least a part of resources in the uplink bandwidth configuration information or the sidelink bandwidth configuration information, for example, determining the sidelink frequency domain resource configuration information based on all resources in the uplink bandwidth configuration information; or determining the sidelink frequency domain resource configuration information based on a part of resources in uplink bandwidth configuration information.

4. The target configuration information includes the sidelink synchronization resource information.

It should be noted that the sidelink synchronization resource information is used for transmitting a sidelink synchronization signal.

Specifically, the sidelink synchronization resource information may include at least one of the following information:

NR sidelink synchronization resource information used for transmitting an NR sidelink synchronization signal; and LTE sidelink synchronization resource information used for transmitting an LTE sidelink synchronization signal.

For example, the NR network-side device indicates LTE sidelink synchronization resource information used for transmitting an LTE sidelink synchronization signal.

For example, the NR network-side device indicates at least one of LTE sidelink synchronization resource information used for transmitting an LTE sidelink synchronization signal and NR sidelink synchronization resource information used for transmitting an NR sidelink synchronization signal.

For example, a preconfiguration of the NR sidelink terminal indicates at least one of LTE sidelink synchronization resource information used for transmitting an LTE sidelink synchronization signal or NR sidelink synchronization resource information used for transmitting an NR sidelink synchronization signal.

For example, other NR sidelink terminals indicate at least one of LTE sidelink synchronization resource information used for transmitting an LTE sidelink synchronization signal or NR sidelink synchronization resource information used for transmitting an NR sidelink synchronization signal.

For example, the LTE network-side device indicates NR sidelink synchronization resource information used for transmitting an NR sidelink synchronization signal.

For example, a preconfiguration of the LTE sidelink terminal indicates NR sidelink synchronization resource information used for transmitting an NR sidelink synchronization signal.

In this case, the first terminal determines the sidelink synchronization resource configuration information in the sidelink resource configuration information based on the sidelink synchronization resource information.

Optionally, the first terminal may further determine a sidelink resource pool.

Optionally, the sidelink resource pool does not include a sidelink synchronization resource indicated in the sidelink synchronization resource information.

Optionally, the sidelink resource pool does not exclude the sidelink synchronization resource indicated in the sidelink synchronization resource information, and the synchronization resource indicated in the sidelink synchronization resource information is not used for sidelink transmission. In other words, when a sidelink resource overlaps the sidelink synchronization resource indicated in the sidelink synchronization resource information, the overlapping part is not used for sidelink transmission. Further, a granularity of the overlapping part may be an OFDM symbol, a resource block (RB), or a resource element (RE). To be specific, transmission of a physical sidelink control channel (PSCCH), a physical sidelink shared channel (PSSCH), or a physical sidelink feedback channel (PSFCH) does not occur on a symbol, an RB, or an RE corresponding to the sidelink synchronization resource.

It should be noted that when the terminal determines whether the sidelink resource pool includes the sidelink synchronization resource indicated in the sidelink synchronization resource information, the determining may be based on the network-side device, a preconfiguration, indications from other terminals, or a indication manner prescribed by a protocol. For example, if the network-side device indicates that the sidelink resource pool does not include the sidelink synchronization resource indicated in the sidelink synchronization resource information, when the terminal determines the sidelink resource pool, the sidelink resource pool does not include the sidelink synchronization resource indicated in the sidelink synchronization resource information.

An implementation example in this case is as follows:

The NR network-side device indicates or the preconfiguration of the NR sidelink terminal includes at least one of the LTE sidelink synchronization resource information or the NR sidelink synchronization resource information; and after the NR sidelink terminal obtains the NR sidelink synchronization resource information of the NR sidelink, when the NR sidelink terminal determines the resource pool, the resource pool does not include the NR sidelink synchronization resource indicated in the NR sidelink synchronization resource information.

After the NR sidelink terminal obtains the LTE sidelink synchronization resource information of the LTE sidelink, possible behavior includes one of the following:

When the NR sidelink terminal determines the resource pool, the resource pool does not include the LTE sidelink synchronization resource indicated in the LTE sidelink synchronization resource information; or the resource pool may not exclude the LTE sidelink synchronization resource indicated in the LTE sidelink synchronization resource information, but the NR sidelink terminal does not perform NR sidelink transmission on the LTE sidelink synchronization resource, that is, when an NR sidelink resource overlaps the LTE sidelink synchronization resource, the overlapping part is not used for NR sidelink transmission.

Another implementation example in this case is as follows:

The LTE network-side device indicates or the preconfiguration of the LTE sidelink terminal includes at least one of the LTE sidelink synchronization resource information or the NR sidelink synchronization resource information; and after the LTE sidelink terminal obtains the LTE sidelink synchronization resource information of the LTE sidelink, when the LTE sidelink terminal determines the resource pool, the resource pool does not include the LTE sidelink synchronization resource indicated in the LTE sidelink synchronization resource information.

After the LTE sidelink terminal obtains the NR sidelink synchronization resource information of the NR sidelink, possible behavior includes one of the following:

When the LTE sidelink terminal determines the resource pool, the resource pool does not include the NR sidelink synchronization resource indicated in the NR sidelink synchronization resource information; or the resource pool may not exclude the NR sidelink synchronization resource indicated in the NR sidelink synchronization resource information, but the LTE sidelink terminal does not perform LTE sidelink transmission on the NR sidelink synchronization resource, that is, when an LTE sidelink resource overlaps the NR sidelink synchronization resource, the overlapping part is not used for LTE sidelink transmission.

5. The target configuration information includes the sidelink timing configuration information.

It should be noted that, in this case, the first terminal determines the sidelink timing information based on the sidelink timing configuration information.

Specifically, the sidelink timing information includes at least one of a sidelink frame number, a subframe identifier, or a slot identifier.

Some embodiments of this disclosure are hereinafter described by using some examples in an actual application.

Case 1: When the target configuration information includes the uplink-downlink configuration information, in some embodiments of this disclosure, at least one type of uplink-downlink configuration information that is the same as an LTE TDD uplink-downlink configuration is supported; or when the target configuration information includes the sidelink time domain configuration information, in some embodiments of this disclosure, at least one type of sidelink time domain configuration information that is the same as an LTE TDD uplink-downlink configuration is supported. In some embodiments of this disclosure, at least one type of sidelink time domain resource configuration information that is the same as an LTE TDD uplink-downlink configuration is supported.

Case 2: When the target configuration information includes the uplink-downlink configuration information, in some embodiments of this disclosure, at least one type of uplink-downlink configuration information that is compatible with an LTE TDD uplink-downlink configuration is supported; or when the target configuration information includes the sidelink time domain configuration information, in some embodiments of this disclosure, one type of sidelink time domain configuration information that is compatible with an LTE TDD uplink-downlink configuration is supported. In some embodiments of this disclosure, at least one type of sidelink time domain resource configuration information that is compatible with an LTE TDD uplink-downlink configuration is supported.

Figure 5:
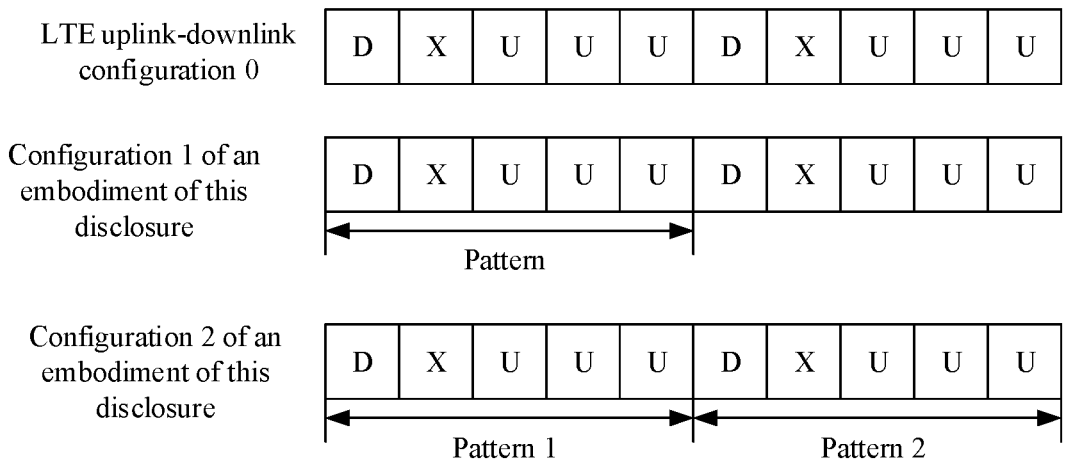
FIG. 5 presents a first schematic configuration diagram of uplink-downlink configuration information, sidelink time domain configuration information, or sidelink time domain resource configuration information.

For example, as shown in FIG. 5, FIG. 5 indicates two configurations of uplink-downlink configuration information, sidelink time domain configuration information, or sidelink time domain resource configuration information. In the manner 1, a pattern period is 5 ms, and a time offset is 5×n+0 ms. In the manner 2, two pattern periods are both 5 ms (that is, an actual period is 10 ms in this case), and a time offset is 5×n+0 ms.

Figure 6:
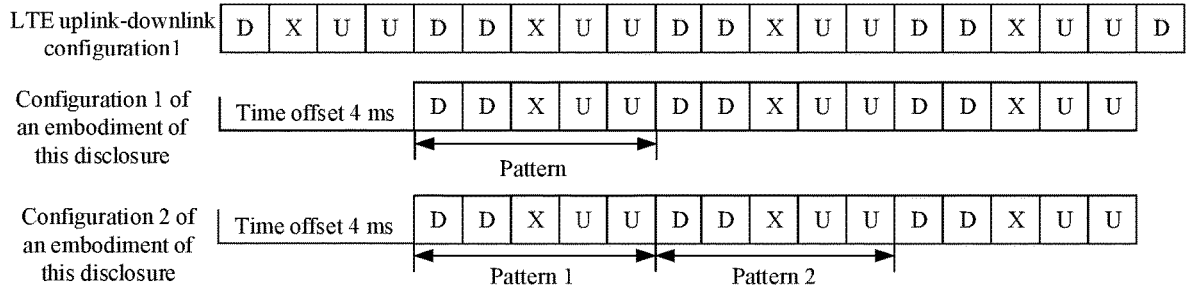
FIG. 6 presents a second schematic configuration diagram of uplink-downlink configuration information, sidelink time domain configuration information, or sidelink time domain resource configuration information.
Figure 7:
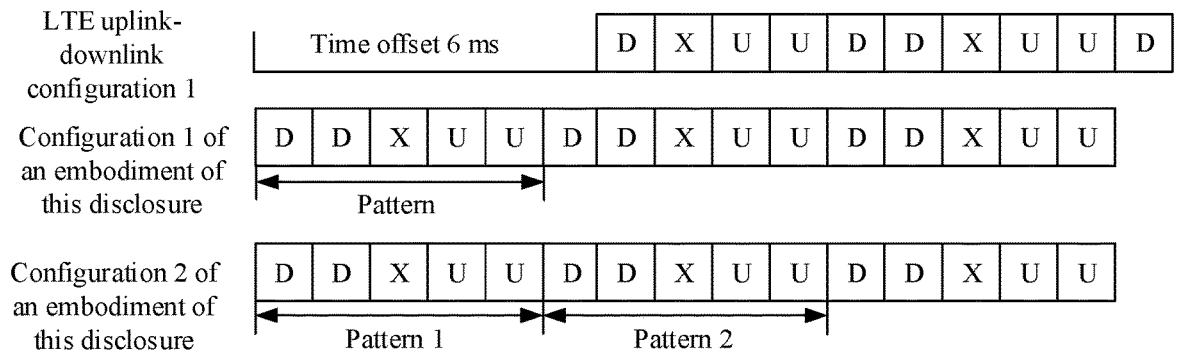
FIG. 7 presents a third schematic configuration diagram of uplink-downlink configuration information, sidelink time domain configuration information, or sidelink time domain resource configuration information.

As shown in FIG. 6, FIG. 6 indicates two configurations of uplink-downlink configuration information, sidelink time domain configuration information, or sidelink time domain resource configuration information. In the manner 1, a pattern period is 5 ms, and a time offset is 5×n+4 ms (or a time offset is 5×n+6 ms, or a time offset=5×n+1 ms). In the manner 2, two pattern periods are both 5 ms (that is, an actual period is 10 ms in this case), and a time offset is 5×n+4 ms (or a time offset is 5×n+6 ms, or a time offset=5×n+1 ms). It should be noted that in FIG. 6, because a starting point of a period of an LTE TDD configuration 1 is used as a reference point, the time offset is 5×n+4 ms. If a starting point of the uplink-downlink configuration information or the sidelink time domain configuration information is used as a reference point, the time offset is 5×n+6 ms (or the time offset is 5×n+1 ms). A specific example is shown in FIG. 7. It can be seen that a value of the time offset is related to the reference point. For other manners, similarly, there may also be two corresponding time offset values based on different reference points, which are not repeated but are only given in parentheses. In addition, based on different reference points, the time offset may also be a negative number. For example, in FIG. 7, it may be considered that the time offset is −6 ms.

Figure 8:
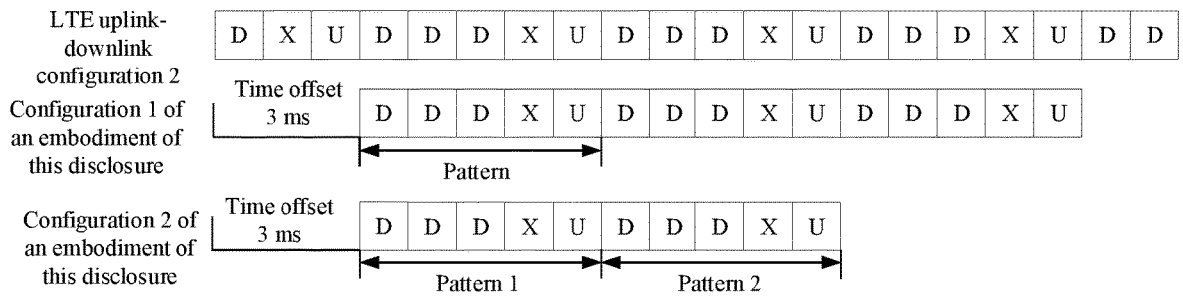
FIG. 8 presents a fourth schematic configuration diagram of uplink-downlink configuration information, sidelink time domain configuration information, or sidelink time domain resource configuration information.

As shown in FIG. 8, FIG. 8 indicates two configurations of uplink-downlink configuration information, sidelink time domain configuration information, or sidelink time domain resource configuration information. In the manner 1, a pattern period is 5 ms, and a time offset is 5×n+3 ms (or a time offset is 5×n+7 ms, or a time offset=5×n+2 ms). In the manner 2, two pattern periods are both 5 ms (that is, an actual period is 10 ms in this case), and a time offset is 5×n+3 ms (or a time offset is 5×n+7 ms, or a time offset=5×n+2 ms).

Figure 9:
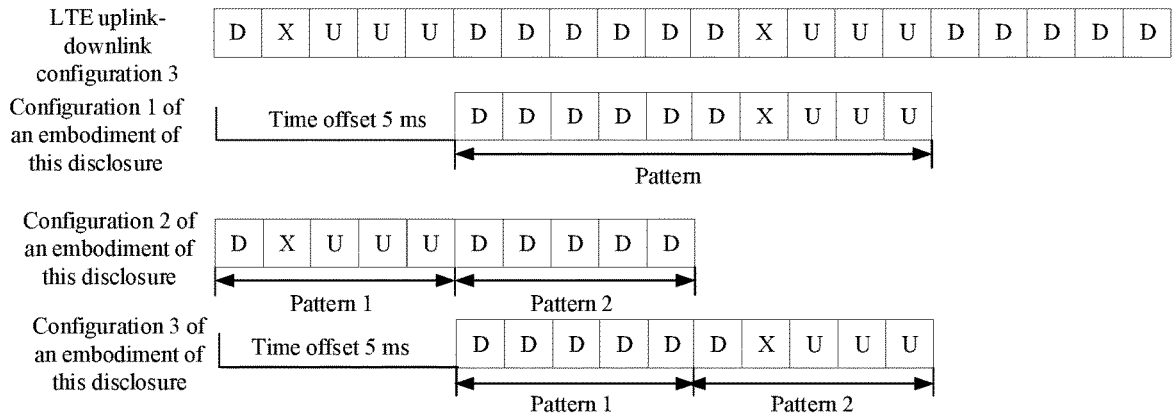
FIG. 9 presents a fifth schematic configuration diagram of uplink-downlink configuration information, sidelink time domain configuration information, or sidelink time domain resource configuration information.

As shown in FIG. 9, FIG. 9 indicates three configurations of uplink-downlink configuration information, sidelink time domain configuration information, or sidelink time domain resource configuration information. In the manner 1, a pattern period is 10 ms, and a time offset is 10×n+5 ms. In the manner 2, two pattern periods are both 5 ms (that is, an actual period is 10 ms in this case), and a time offset is 10×n+0 ms. In the manner 3, two pattern periods are both 5 ms (that is, an actual period is 10 ms in this case), and a time offset is 10×n+5 ms.

Figure 10:
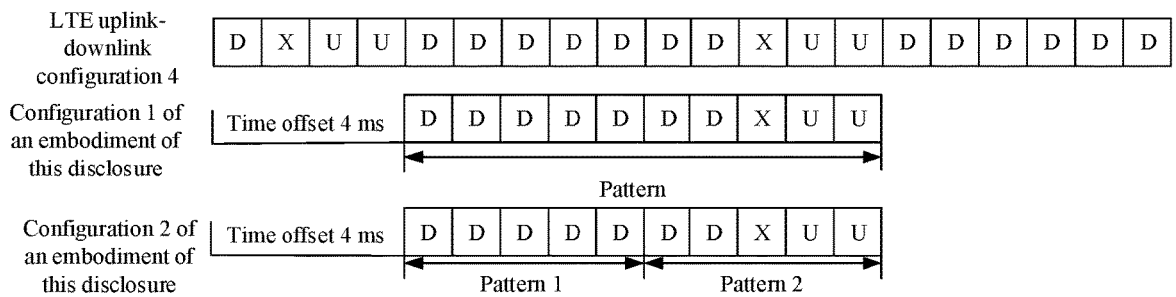
FIG. 10 presents a sixth schematic configuration diagram of uplink-downlink configuration information, sidelink time domain configuration information, or sidelink time domain resource configuration information.

As shown in FIG. 10, FIG. 10 indicates two configurations of uplink-downlink configuration information, sidelink time domain configuration information, or sidelink time domain resource configuration information. In the manner 1, a pattern period is 10 ms, and a time offset is 10×n+4 ms (or a time offset is 10×n+6 ms). In the manner 2, two pattern periods are both 5 ms (that is, an actual period is 10 ms in this case), and a time offset is 10×n+4 ms (or a time offset is 10×n+6 ms).

Figure 11:
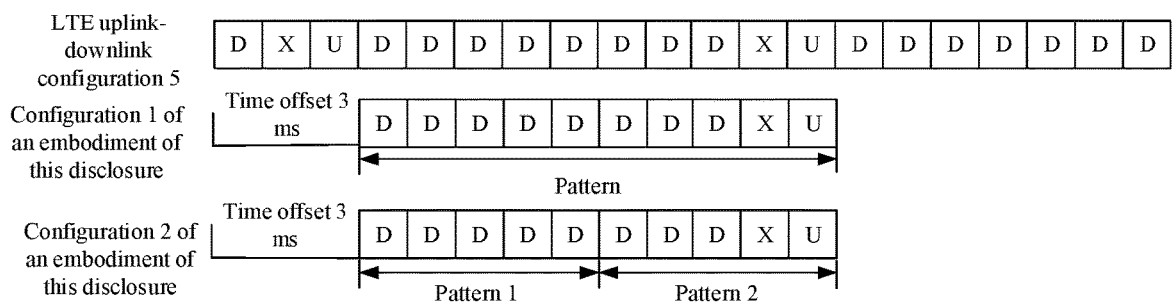
FIG. 11 presents a seventh schematic configuration diagram of uplink-downlink configuration information, sidelink time domain configuration information, or sidelink time domain resource configuration information.

As shown in FIG. 11, FIG. 11 indicates two configurations of uplink-downlink configuration information, sidelink time domain configuration information, or sidelink time domain resource configuration information. In the manner 1, a pattern period is 10 ms, and a time offset is 10×n+3 ms (or a time offset is 10×n+7 ms). In the manner 2, two pattern periods are both 5 ms (that is, an actual period is 10 ms in this case), and a time offset is 10×n+3 ms (or a time offset is 10×n+7 ms).

Figure 12:
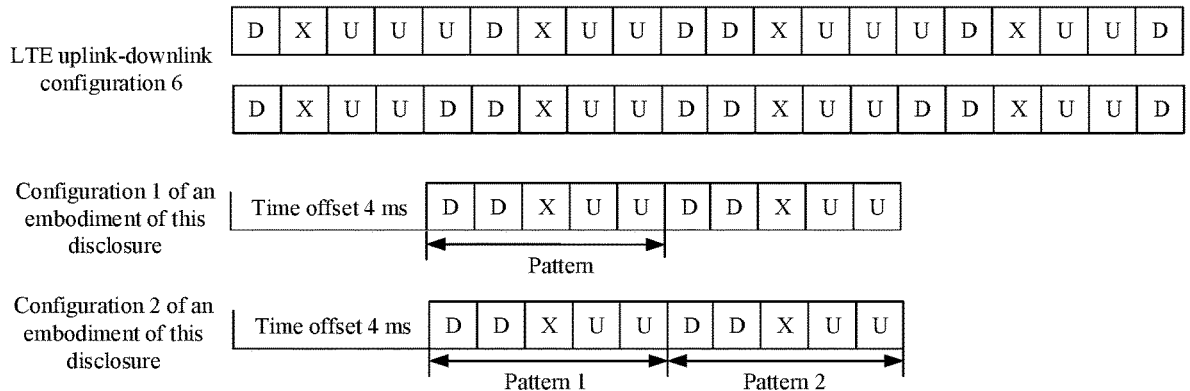
FIG. 12 presents an eighth schematic configuration diagram of uplink-downlink configuration information, sidelink time domain configuration information, or sidelink time domain resource configuration information.

As shown in FIG. 12, FIG. 12 indicates two configurations of uplink-downlink configuration information, sidelink time domain configuration information, or sidelink time domain resource configuration information. In the manner 1, a pattern period is 10 ms, and a time offset is 5×n+4 ms (or a time offset is 5×n+6 ms, or a time offset=5×n+1 ms). In the manner 2, two pattern periods are both 5 ms (that is, an actual period is 10 ms in this case), and a time offset is 5×n+4 ms (or a time offset is 5×n+6 ms, or a time offset=5×n+1 ms). It should be noted that, to simplify settings, one U in the configuration in FIG. 12 is replaced with D.

It should be noted that n is an integer.

The period and time offset in the foregoing examples are given in units of ms. If the units are uniformly replaced with other units, for example, slots or symbols, the terminal can still work. Details are not described.

A scenario considered for the foregoing design in FIG. 12 is that the LTE network-side device controls the NR sidelink terminal, where an uplink-downlink configuration carried in a sidelink SIB or a SIB1 of the LTE network-side device may be in a form of an LTE TDD uplink-downlink configuration. In this case, the NR sidelink terminal infers sidelink time domain resource configuration information based on the obtained LTE TDD uplink-downlink configuration. In this case, the sidelink time domain resource configuration information inferred by the NR sidelink terminal needs to be compatible with the obtained LTE TDD uplink-downlink configuration (for example, uplink-downlink distribution is consistent, or sidelink resources in the inferred sidelink time domain resource configuration information is a whole set or a subset of available sidelink resources in the LTE TDD UL/DL configuration, to prevent a sidelink user from performing sidelink transmission on resources unusable for SL transmission, which otherwise causes interference). For example, the LTE network-side device uses an LTE TDD UL/DL configuration 6. In this case, the NR sidelink terminal can use the sidelink time domain resource configuration information inferred in the manner 1 or the manner 2 in FIG. 12, so that the sidelink time domain resource configuration information is aligned with the LTE TDD uplink-downlink configuration of the base station. In this case, it can be seen that a time offset of 4 ms needs to be introduced.

Another scenario considered for the foregoing design is that the LTE network-side device controls an NR sidelink user, where a UL/DL configuration carried in a SIB1 of the LTE network-side device is in a form of an LTE TDD UL/DL configuration. The LTE network-side device may select one piece of sidelink time domain configuration information or an NR UL/DL configuration that is compatible with the LTE TDD UL/DL configuration in the SIB1 of the LTE network-side device, and send the sidelink time domain configuration information or NR UL/DL configuration to an LTE sidelink user by using another SIB or RRC. For example, the UL/DL configuration carried in the SIB1 is an LTE TDD UL/DL configuration 6. In this case, the base station may indicate the configuration in the manner 1 or the manner 2 in FIG. 12 to the user in the another SIB or RRC. In this case, it can be seen that a time offset of 4 ms needs to be introduced.

Another scenario considered for the foregoing design is that the NR network-side device controls an LTE sidelink user, where a UL/DL configuration carried in a SIB of the NR network-side device is in a form of an NR UL/DL configuration. In this case, the LTE sidelink user infers sidelink time domain resource configuration information based on the obtained NR UL/DL configuration. In this case, the sidelink time domain resource configuration information determined by the LTE sidelink user needs to be compatible with the obtained NR UL/DL configuration (for example, uplink-downlink distribution is consistent, or available SL resources in the sidelink time domain resource configuration information are a whole set or a subset of available SL resources in the NR UL/DL configuration, to prevent the sidelink user from performing transmission on resources unusable for SL transmission, which otherwise causes interference). For example, the NR network-side device uses the NR UL/DL configuration corresponding to the manner 1 in FIG. 12. In this case, the LTE sidelink user can use the LTE configuration 6 as the sidelink time domain resource configuration information, so that the sidelink time domain resource configuration information is aligned with the NR UL/DL configuration indicated by the base station. In this case, it can be seen that a time offset of 4 ms needs to be introduced.

Another scenario considered for the foregoing design is that the NR network-side device controls an LTE sidelink user, where a UL/DL configuration carried in a SIB1 of the NR network-side device is in a form of an NR UL/DL configuration. The NR network-side device may select one piece of sidelink resource configuration information or an LTE TDD UL/DL configuration that is compatible with the NR UL/DL configuration in the SIB1 of the NR network-side device, and send the sidelink resource configuration information or LTE TDD UL/DL configuration to the LTE sidelink user by using another SIB or RRC. For example, the UL/DL configuration carried in the SIB1 is the configuration in the manner 1 or the manner 2 in FIG. 12. In this case, the base station may indicate the LTE TDD UL/DL configuration 6 to the user in another SIB or RRC. In this case, it can be seen that a time offset of 4 ms needs to be introduced.

Another scenario considered for the foregoing design is that the NR network-side device indicates, in an SL SIB or SL RRC, an LTE TDD UL/DL configuration that is compatible with a UL/DL configuration indicated in a SIB1 of the NR network-side device. For example, the UL/DL configuration carried in the SIB1 is the UL/DL configuration in the manner 1 or the manner 2 in FIG. 12. In this case, the base station may indicate the LTE TDD UL/DL configuration 6 in an SL SIB or RRC to a user.

Another scenario considered for the foregoing design is that the LTE network-side device indicates, in an SL SIB or SL RRC, a TDD UL/DL configuration that is compatible with an LTE TDD UL/DL configuration indicated in a SIB1 of the LTE network-side device. For example, the SIB1 of the LTE network-side device indicates use of the LTE TDD UL/DL configuration 6. In this case, the corresponding UL/DL configuration in the manner 1 or the manner 2 in FIG. 12 may be indicated in the SL SIB or SL RRC.

It should be noted that the examples herein are provided for ease of understanding only, and not limited to the foregoing six scenarios. The time offset may be explicitly indicated by the network-side device or another terminal, or may be defined by a protocol or preconfigured. One manner is to automatically infer a current time offset and sidelink time domain configuration information based on a currently obtained LTE TDD uplink-downlink configuration. Another manner is that the network-side device or another terminal indicates the time offset. Optionally, after determining the time offset, the terminal may also indicate the time offset on a PSBCH.

It should be noted that in FIG. 5 to FIG. 12, in a case of an NR TDD DL/UL configuration, NR sidelink time domain configuration information, or NR sidelink time domain resource configuration information, D in the figures represents a downlink resource, U represents an uplink resource, and X represents a flexible resource. Alternatively, in another implementation, X may be used to represent a downlink resource. Alternatively, in another implementation, X is used to represent an uplink resource. In a case of an LTE TDD DL/UL configuration, LTE sidelink time domain configuration information, or LTE sidelink time domain resource configuration information, D represents a downlink resource, U represents an uplink resource, and X represents a special subframe.

Each grid in FIG. 5 to FIG. 12 is 1 slot or 1 ms.

It should be further noted that the foregoing pattern period may be inferred based on the currently obtained configuration.

Uplink-downlink configuration information, sidelink time domain configuration information, or sidelink time domain resource configuration information that may also be supported satisfies:

when the period of the uplink-downlink configuration information, the sidelink time domain configuration information, or the sidelink time domain resource configuration information is 5 ms or 5 slots, the following possible configurations are included:

Last L milliseconds or slots in the period of the uplink-downlink configuration information, the sidelink time domain configuration information, or the sidelink time domain resource configuration information may be used for sidelink transmission; and first L milliseconds or slots in the period of the uplink-downlink configuration information, the sidelink time domain configuration information, or the sidelink time domain resource configuration information may be used for sidelink transmission.

Figure 13:
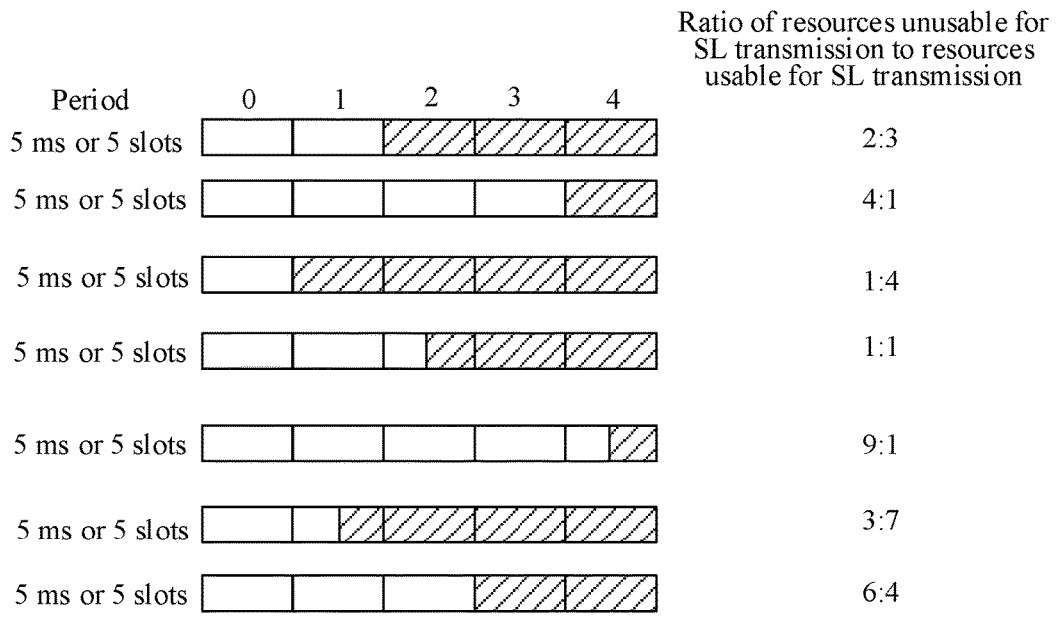
FIG. 13 presents a ninth schematic configuration diagram of uplink-downlink configuration information, sidelink time domain configuration information, or sidelink time domain resource configuration information.

Optionally, a value of L may be 3, 1, 4, 2.5, 0.5, 3.5, or 2, specifically as shown in FIG. 13.

Optionally, a ratio of resources unusable for sidelink transmission to resources usable for sidelink transmission may be 2:3, 4:1, 1:4, 1:1, 9:1, 3:7, or 6:4.

When the period of the uplink-downlink configuration information, the sidelink time domain configuration information, or the sidelink time domain resource configuration information is 10 ms or 10 slots, the following possible configurations are included:

Last L milliseconds or slots in the period of the uplink-downlink configuration information, the sidelink time domain configuration information, or the sidelink time domain resource configuration information may be used for sidelink transmission; and first L milliseconds or slots in the period of the uplink-downlink configuration information, the sidelink time domain configuration information, or the sidelink time domain resource configuration information may be used for sidelink transmission.

Figure 14:
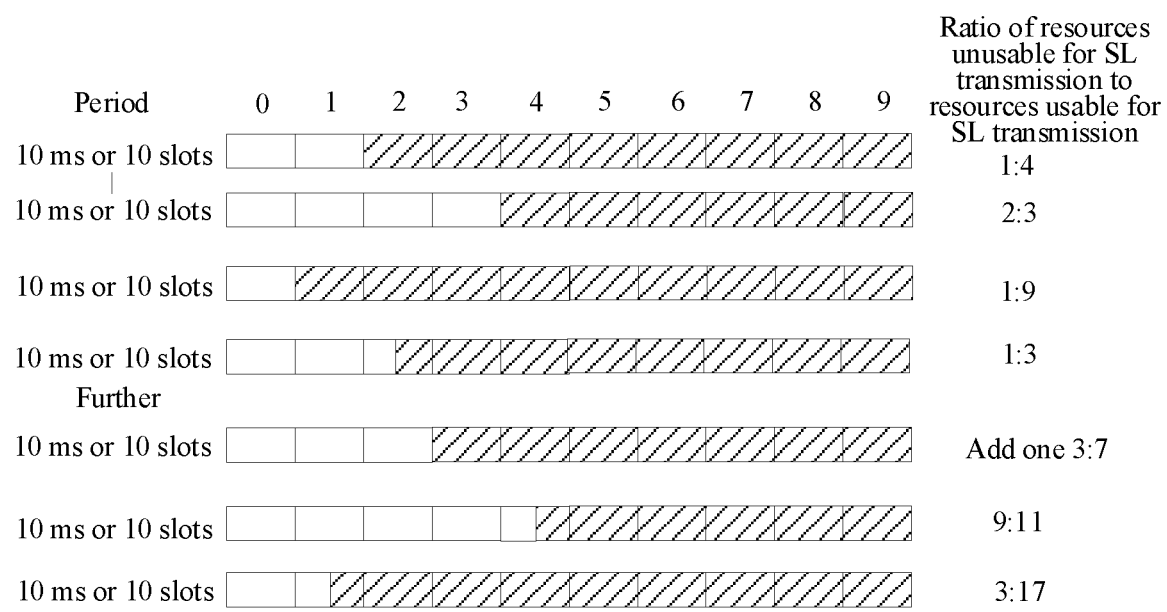
FIG. 14 presents a tenth schematic configuration diagram of uplink-downlink configuration information, sidelink time domain configuration information, or sidelink time domain resource configuration information.

Optionally, a value of L may be 8, 6, 9, 7.5, 7, 5.5 or 8.5, specifically as shown in FIG. 14. It should be noted herein that an unfilled box in FIG. 13 and FIG. 14 indicates a resource unusable for sidelink transmission, and a slash-filled box indicates a resource usable for sidelink transmission.

Optionally, a ratio of resources unusable for sidelink transmission to resources usable for sidelink transmission may be 1:4, 2:3, 1:9, 1:3, 3:7, 9:11 or 3:17.

Case 3: An implementation form of indicating the uplink-downlink configuration information, the sidelink time domain configuration information, or the sidelink time domain resource configuration information is: indicating the uplink-downlink configuration information, the sidelink time domain configuration information, or the sidelink time domain resource configuration information by using identification information, where different identifiers correspond to different uplink-downlink configuration information, sidelink time domain configuration information, or sidelink time domain resource configuration information.

For example, with reference to the case 1, in an example, each identifier corresponds to an LTE TDD uplink-downlink configuration (it should be noted that only a part of LTE TDD uplink-downlink configurations may be supported).

More specifically, the configuration information includes an identifier, or the configuration information includes a plurality of identifiers, and in this case, configurations corresponding to the plurality of identifiers are concatenated to obtain final uplink-downlink configuration information or sidelink time domain configuration information, and a period is also a sum of periods of all corresponding configurations.

For example, with reference to an case 2, in an example, each identifier corresponds to one piece of uplink-downlink configuration information or sidelink time domain configuration information in the case 2. It should be noted that only a part of configurations in FIG. 15 may be supported. For example, only a configuration with a period of 10 ms is supported. It should be noted that each of configurations 1, 3, 5, 7, 8, 10, 12, and 14 in FIG. 15 includes two patterns. One grid in FIG. 15 is a slot or 1 ms. Optionally, one grid in the figure is a 15 kHz slot, that is, one subframe.

One implementation is to indicate a specific configuration by using a configuration identifier. In this case, a configuration includes one or more patterns. For example, a configuration number in FIG. 15 is indicated by an identifier.

Another implementation is to use different configuration identifiers to indicate different patterns respectively, for example, use two configurations to indicate a pattern 1 and a pattern 2 respectively. For example, possible configurations of the pattern 1 and the pattern 2 are numbered separately, and two identifiers are used to indicate the configurations of the pattern1 and the pattern 2 respectively. When indication information of the pattern 2 is a value (for example, 16), it indicates that the pattern 2 does not exist in this case.

Optionally, the network-side device or the terminal may further carry time offset information, or for one of the foregoing configurations, the time offset may be fixed and can be implicitly inferred, so that it is not necessary to additionally carry time offset indication information.

Case 4: An implementation form of indicating the uplink-downlink configuration information (or the sidelink time domain configuration information or the sidelink time domain resource configuration information) is that the uplink-downlink configuration information or the sidelink time domain configuration information includes at least one attribute of the following information:

the period corresponding to the uplink-downlink configuration information (or the sidelink time domain configuration information or the sidelink time domain resource configuration information), where it should be noted that if there are a plurality of periods corresponding to the uplink-downlink configuration information, a plurality of parameters may be used to indicate the plurality of periods respectively, or one parameter may be used to indicate a combination of the plurality of periods jointly;

indication information of downlink resources, for example, including at least one of the number of resources of the downlink resources and a resource bitmap of the downlink resources;

indication information of uplink resources, for example, including at least one of the number of resources of the uplink resources and a resource bitmap of the uplink resources;

indication information of flexible resources, for example, at least one of the number of resources of the flexible resources and a resource bitmap of the flexible resources;

indication information of uplink resources and flexible resources, for example, at least one of the number of resources of the uplink resources and the flexible resources and a resource bitmap of the uplink resources and the flexible resources;

indication information of downlink resources and flexible resources, for example, at least one of the number of resources of the downlink resources and the flexible resources and a resource bitmap of the downlink resources and the flexible resources;

indication information of sidelink resources,
for example, at least one of the number of the sidelink resources and a resource bitmap of the sidelink resources; and
a numerical configuration, where
for example, the numerical configuration includes at least one of a SCS and a CP type.

For example, it is assumed that the sidelink time domain resource configuration information can only reuse uplink resources.

Example 1: The uplink-downlink configuration information, the sidelink time domain configuration information, or the sidelink time domain resource configuration information indicates the period, the number of downlink resources, and the number of uplink resources, so that distribution of the downlink resources, uplink resources, and flexible resources can be calculated by using the configuration information, to know which resources are uplink resources, where the resources may be used for sidelink transmission.

Example 2: The uplink-downlink configuration information, the sidelink time domain configuration information, or the sidelink time domain resource configuration information indicates the period and the number A of uplink resources, where first A resources from the end of the period are uplink resources, and the resources may be used for sidelink transmission.

Example 3: The uplink-downlink configuration information, the sidelink time domain configuration information, or the sidelink time domain resource configuration information indicates the period and the total number B of resources of downlink resources and flexible resources, so that except first B resources in the period, all resources are uplink resources, where the resources may be used for sidelink transmission.

An indication unit of the foregoing resources may be at least one of a symbol, a slot, a subframe, a frame, or a period. A case for "at least one" is indicating that X slots are uplink slots, and that Y symbols in a slot before the X slots are downlink symbols.

For the foregoing examples 1 and 2 in which the number of uplink resources needs to be indicated, if a unit does not include only uplink resources, the unit is not counted into uplink resources. For example, if the number of uplink resources indicates the number of uplink slots, when a slot does not include only uplink symbols (for example, further includes downlink resource symbols and flexible resource symbols, or further includes flexible resource symbols), the slot is not counted into the number of uplink slots.

For the foregoing example 3 in which the total number of resources of downlink resources and flexible resources needs to be indicated, if a unit does not include only uplink resources, the unit is counted into the total number of resources of downlink resources and flexible resources, but not counted into the number of uplink resources. For example, if the number of downlink resources and flexible resources indicates the number of downlink resource slots and flexible resource slots, when a slot does not include only uplink symbols (for example, further includes downlink resource symbols and flexible resource symbols, or further includes flexible resource symbols), the slot is not counted into the number of uplink slots, but counted into the total number of downlink resource slots and flexible resource slots. More specifically, if the slot includes uplink resources and flexible resources, the slot is considered as a flexible resource slot; or if the slot includes uplink resources, downlink resources, and flexible resources, the slot is considered as a downlink resource slot or a flexible resource slot.

For example, it is assumed that the sidelink time domain resource configuration information can only reuse uplink resources and flexible resources.

Example 1: The uplink-downlink configuration information, the sidelink time domain configuration information, or the sidelink time domain resource configuration information indicates the period, the number of downlink resources, the number of flexible resources, and the number of uplink resources, so that distribution of the downlink resources, uplink resources, and flexible resources can be obtained directly from the configuration information, to know which resources are uplink resources or flexible resources, where the resources may be used for sidelink transmission.

Example 2: The uplink-downlink configuration information, the sidelink time domain configuration information, or the sidelink time domain resource configuration information indicates the period, the number of DL resources, and the number of UL resources, so that distribution of the downlink resources, uplink resources, and flexible resources can be calculated by using the configuration information, to know which resources are uplink resources and flexible resources, where the resources may be used for sidelink transmission.

Example 3: The uplink-downlink configuration information, the sidelink time domain configuration information, or the sidelink time domain resource configuration information indicates the period and the number C of resources of uplink resources and flexible resources, where first C resources from the end of the period are uplink resources and flexible resources, and the resources may be used for sidelink transmission.

Example 4: The uplink-downlink configuration information, the sidelink time domain configuration information, or the sidelink time domain resource configuration information indicates the period and the number D of resources of downlink resources, so that except first D resources in the period, all resources are uplink resources and flexible resources, where the resources may be used for sidelink transmission.

An indication unit of the foregoing resources may be at least one of a symbol, a slot, a subframe, a frame, or a period. For the foregoing example, if a unit includes downlink resources but does not include only downlink resources, the unit is considered as downlink resources. For example, if the number of resources of uplink resources indicates the number of downlink slots, when a slot does not include only downlink resource symbols (for example, further includes downlink resource symbols and flexible resource symbols, or further includes flexible resource symbols), the slot is considered as the number of downlink resources, and not considered as uplink resources or flexible resources.

For a combination of the period and the SCS,
when the uplink-downlink configuration information or the sidelink time domain configuration information includes a plurality of pieces of information, the plurality of pieces of information may be indicated jointly. For example, a parameter is used to indicate the combination of the period and the SCS jointly.

For example, when one pattern is included in a configuration, possible combinations are shown in Table 2.

TABLE 2

Combination table of the pattern period and the SCS

| SCS | Pattern period | | | | | | |
|---|---|---|---|---|---|---|---|
| 15 kHz | 0.5 | 1 | 2 | 5 | 10 | | |
| 30 kHz | 0.5 | 1 | 2 | 2.5 | 5 | 10 | |
| 60 kHz | 0.5 | 1 | 1.25 | 2 | 2.5 | 5 | 10 |
| 120 kHz | 0.5 | 0.625 | 1 | 1.25 | 2 | 2.5 | 5 | 10 |

There are a total of 26 combinations. Therefore, in an implementation, five bits are required for indication the combination of the SCS and the period.

Another consideration is that the combinations of the SCS and the period supported by different frequency ranges may be different, so that different indications are used in different frequency ranges. For example, it is assumed that an FR2 (>6 GHz) supports only 60 kHz and 120 kHz, and that an FR1 (<6 GHz) supports only 15 kHz, 30 kHz, and 60 kHz. Therefore, there are 18 configurations in the FR1 and 15 configurations in the FR2. Therefore, in the FR1, five bits are required for indication, and in the FR2, four bits are required for indication, or the FR1 and the FR2 both use five bits.

When there are two CP types in the foregoing embodiment, similar logic may also be used to indicate a combination of the SCS, the CP, and the period jointly by using one parameter. Correspondingly, the number of required bits may be increased, or a separate parameter may be used to indicate the CP type.

For another example, when a configuration may include one or more patterns, possible combinations are shown in Table 3.

TABLE 3

Combination table of the pattern period and the SCS

| SCS | Configuration periods (ms) in one or more pattern combinations | | | | | | | |
|---|---|---|---|---|---|---|---|---|
| 15 kHz | 0.5 | 1 | 2 | 4 | 5 | 10 | 20 | |
| 30 kHz | 0.5 | 1 | 2 | 2.5 | 4 | 5 | 10 | 20 |
| 60 kHz | 0.5 | 1 | 1.25 | 2 | 2.5 | 4 | 5 | 10 | 20 |
| 120 kHz | 0.5 | 0.625 | 1 | 1.25 | 2 | 2.5 | 4 | 5 | 10 | 20 |

There are a total of 34 combinations. Therefore, six bits are required for indication the combination of the SCS and the period.

Another consideration is that the combinations of the SCS and the period supported by different frequency ranges may be different, so that different indications are used in different frequency ranges. For example, it is assumed that an FR2 supports only 60 kHz and 120 kHz, and that an FR1 supports only 15 kHz, 30 kHz, and 60 kHz. Therefore, there are 24 configurations in the FR1 and 19 configurations in the FR2. Therefore, in the FR1, five bits are required, and in the FR2, five bits are required, or the FR1 and the FR2 both use five bits.

When there are two CP types in the foregoing embodiment, similar logic may also be used to indicate a combination of the SCS, the CP, and the period jointly by using one parameter. Correspondingly, the number of required bits may be increased, or a separate parameter may be used to indicate the CP type.

When the SL configuration or UL/DL configuration includes a plurality of pieces of information, different parameters may also be used to indicate different information respectively. For example, different parameters may be used to indicate the SCS and the period respectively.

For indication the pattern period, one method is that if a configuration includes at least one pattern and one parameter is used to indicate one pattern period, N parameters indicate N pattern periods respectively; and another method is to use one parameter to indicate the periods jointly that are corresponding to the uplink-downlink configuration information, the sidelink time domain configuration information, or the sidelink time domain resource configuration information.

As described earlier, when a configuration includes one pattern, a period of the configuration is a period of the pattern. When a configuration includes two patterns, a period of the configuration is a sum of periods of the two patterns.

Assuming that a configuration can include only one pattern, possible values of a period P of the pattern are as follows:
P={0.5, 0.625, 1, 1.25, 2, 2.5, 5, 10} ms, 8 configurations in total.

Assuming that periods of two patterns are P1 and P2 respectively, when a configuration includes one or two patterns, P is a sum of periods of patterns included in the configuration, and possible values of P are as follows:
P=P1+P2={0.5, 0.625, 1, 1.25, 2, 2.5, 4, 5, 10, 20} ms, 10 configurations in total.

Therefore, a possible period of the configuration is {0.5, 0.625, 1, 1.25, 2, 2.5, 4, 5, 10, 20} ms, and there are 10 configurations in total.

In this case, for the case of indicating two patterns separately, one method is to use two pieces of 3-bit information to indicate periods of the two patterns separately. Another method is to use one piece of 4-bit information for joint indicating when one parameter is used to indicate the period of the uplink-downlink configuration information, the sidelink time domain configuration information, or the sidelink time domain resource configuration information jointly.

In this case, for the case of joint indicating, there are 18 combinations in total. Therefore, five bits can clearly indicate all cases of combinations when the configuration period includes one pattern period and includes two pattern periods.

When the obtained UL/DL configuration information or the obtained sidelink time domain configuration information includes a plurality of patterns, one method for determining the sidelink time domain resource configuration information by the terminal is determining the sidelink time domain resource configuration information only based on a part of the plurality of patterns. Further, a specific pattern based on which the sidelink time domain resource configuration information is determined may be indicated by the network side device, or indicated by another terminal, or preconfigured, or predefined by a protocol. For example, when the obtained UL/DL configuration information or the obtained sidelink time domain configuration information includes two patterns, the sidelink time domain resource configuration information is determined based on a first pattern. For example, when the obtained UL/DL configuration information or the obtained sidelink time domain configuration information includes two patterns, the sidelink time domain resource configuration information is determined based on a second pattern.

When the obtained UL/DL configuration information or the obtained sidelink time domain configuration information includes one or more patterns, one method for determining the sidelink time domain resource configuration information by the terminal is determining the sidelink time domain resource configuration information only based on resources in a period within a predetermined time. Further, a specific period P within a predetermined time based on which the sidelink time domain resource configuration information is determined may be indicated by a transmit end, or preconfigured, or predefined by a protocol. The predetermined time may be indicated by the network device, or indicated by another terminal, or preconfigured, or predefined by a protocol. For example, when the period of the obtained UL/DL configuration or the obtained sidelink time domain configuration information is P, the sidelink time domain resource configuration information is determined based on resources in a last period P within the predetermined time. For example, when the period of the obtained UL/DL configuration or the obtained sidelink time domain configuration information is P, the sidelink time domain resource configuration information is determined based on resources in a first period P within the predetermined time.

Specific content of the UL/DL configuration information or the sidelink time domain configuration information may include one of the following:

1. a numerical configuration, a configuration period, and the indicated number of resources unusable for SL transmission;
2. a numerical configuration, a configuration period, and an indication of resources usable for SL transmission;
3. a configuration period, and an indication of resources unusable for SL transmission;
4. a configuration period, and an indication of resources usable for SL transmission;
5. an indication of resources unusable for SL transmission;
6. the indicated number of resources usable for SL transmission;
7. a configuration period, and an indication of resources usable for SL transmission in each pattern;
8. a configuration period, and an indication of an intersection set of resources usable for SL transmission in each pattern; and
9. a configuration period, and an indication of a union set of resources usable for SL transmission in each pattern.

The foregoing resources usable for SL transmission are resources that can be reused for SL transmission among the uplink, downlink, and flexible resources.

The foregoing resources unusable for SL transmission are resources that cannot be reused for SL transmission among the uplink, downlink, and flexible resources.

Case 5

A unit of the resource indication information may be a symbol, a slot, a subframe, a millisecond, or a frame. When high overheads are required for indication the resources, the overheads can be reduced by increasing the unit of the resource indication.

For example, assuming that a pattern has a maximum period of 10 ms, when SCS=120 kHz, the period includes a maximum of 80 slots. If a unit indicating a resource in the pattern is a slot, seven bits are required. If a configuration includes two patterns, 14 bits are required for indication resources in the two patterns respectively. The overheads are excessively high for the PSBCH. Therefore, one solution is that the unit for indication the resource is a subframe or ms. In this case, only four bits are required for indication resources in each of the two patterns, that is, eight bits are required in total.

Further, units for indication resources in different combinations of configuration periods or pattern periods may be different. For example, when the configuration period or the pattern period is longer than A ms, the unit for indication the resource is ms; or when the pattern period is longer than B slots and shorter than or equal to A ms, the unit for indication the resource is a slot; or when the configuration period or the pattern period is shorter than or equal to B slots, the unit for indication the resource is a symbol. In one case, A=B=1.

Optionally, when the period of the UL/DL configuration, the sidelink time domain configuration information, or the sidelink time domain resource configuration information is 1 slot, another manner is to configure a compatible SFI index for each slot.

A special case is that when the terminal performs an NR sidelink service and an LTE sidelink service simultaneously, the terminal infers two pieces of sidelink time domain resource configuration information based on the obtained UL/DL configuration or sidelink time domain configuration information, which are used for an NR sidelink and an LTE sidelink respectively. Resources indicated in one of the two pieces of sidelink time domain resource configuration information that are used for transmission for the NR sidelink and the LTE sidelink is a subset of resources indicated by an obtained UL/DL configuration or sidelink time domain configuration, and resources indicated in the other of the two pieces of sidelink time domain resource configuration information that are used for transmission of the NR sidelink and the LTE sidelink is another subset of resources indicated by the obtained UL/DL configuration or sidelink time domain configuration, where the two subsets do not overlap with each other. For example, the terminal performs the NR sidelink service and the LTE sidelink service simultaneously, and obtains an NR UL/DL configuration from the NR base station. In this case, the user determines, based on a whole set or a subset of resources indicated by uplink resources in the obtained UL/DL configuration, a sidelink time domain resource configuration used for NR sidelink transmission, and the user determines, based on a whole set or a subset of downlink resources in the obtained UL/DL configuration, a sidelink time domain resource configuration used for NR sidelink transmission. As a result, NR sidelink transmission and LTE sidelink transmission do not overlap each other in time domain, and a problem of half-duplex, power reduction, or internal interference of a module due to a requirement for simultaneously performing NR sidelink transmission and LTE sidelink transmission is avoided.

Compatibility mentioned in some embodiments of this disclosure means that the resources usable for SL transmission in the uplink-downlink configuration information, the sidelink time domain configuration information, or the sidelink time domain resource configuration information (for example, uplink resources, or uplink resources and flexible resources) are a whole set or a subset of corresponding types of resources in the uplink-downlink configuration indicated by the SIB1 of the network-side device.

Case 6: The LTE network-side device controls the NR terminal.

The LTE network-side device controls the NR sidelink terminal, only the SIB1 carries the LTE TDD uplink-downlink configuration, and the sidelink SIB used to provide an NR sidelink service does not carry the TDD uplink-downlink configuration; or the LTE network-side device controls the NR sidelink terminal, and the sidelink SIB used to provide an NR sidelink service carries the TDD uplink-downlink configuration.

1. One case is that a correspondence between the TDD uplink-downlink configuration in the sidelink SIB and the LTE uplink-downlink configuration in the SIB1 comply with the case 2, that is, the network-side device determines the uplink-downlink configuration in the sidelink SIB based on the correspondence in the case 2.

2. Another case is that the uplink-downlink configuration in the sidelink SIB is also an LTE TDD uplink-downlink configuration. In this case, the following is true.

2-1. The LTE TDD uplink-downlink configuration in the sidelink SIB is the same as the LTE TDD uplink-downlink configuration in the SIB1; or 2-2. an uplink resource part in the LTE TDD uplink-downlink configuration in the sidelink SIB is a subset of an uplink resource part in the LTE TDD uplink-downlink configuration in the SIB 1.

The LTE network-side device controls the NR sidelink terminal, and only the SIB1 carries the LTE TDD uplink-downlink configuration. If the NR sidelink terminal obtains the LTE TDD uplink-downlink configuration in the SIB1, the NR sidelink terminal can infer the sidelink time domain resource configuration information based on the correspondence in the case 2.

If the NR sidelink terminal obtains the uplink-downlink configuration from the sidelink SIB of the NR sidelink service sent by the LTE network-side device, and the uplink-downlink configuration is an LTE TDD uplink-downlink configuration, the NR sidelink terminal can infer the sidelink time domain resource configuration information based on the correspondence in the case 2.

Case 7: The NR network-side device controls the LTE terminal.

In this case, the NR network-side device uses identification information in the sidelink SIB or sidelink RRC to indicate the uplink-downlink configuration, and uses a configuration identifier to indicate an LTE TDD uplink-downlink configuration, where the uplink-downlink configuration is compatible with an uplink-downlink configuration in an NR SIB 1.

If the NR network-side device does not indicate the LTE TDD uplink-downlink configuration in the sidelink SIB or the sidelink RRC, a possible manner is that if the LTE sidelink terminal obtains a semi-static uplink-downlink configuration configured in the SIB1, the sidelink time domain resource configuration information is set to an LTE TDD uplink-downlink configuration that is compatible with the semi-static uplink-downlink configuration configured in the SIB1 of the NR network-side device.

Herein, the compatibility means that uplink resources in the uplink-downlink configuration in the sidelink SIB are a subset or a whole set of uplink resources in the semi-static uplink-downlink configuration configured in the SIB1, or that uplink resources in the uplink-downlink configuration in the sidelink RRC are a subset or a whole set of uplink resources in the semi-static uplink-downlink configuration configured in the SIB1, or that uplink resources that may be used for the sidelink in the sidelink time domain resource configuration information are a subset or a whole set of uplink resources in the semi-static uplink-downlink configuration configured in the SIB1, or that uplink resources and flexible resources in the uplink-downlink configuration in the sidelink SIB are a subset or a whole set of uplink resources and flexible resources in the semi-static uplink-downlink configuration configured in the SIB1, or that uplink resources and flexible resources in the uplink-downlink configuration in the sidelink RRC are a subset or a whole set of uplink resources and flexible resources in the semi-static uplink-downlink configuration configured in the SIB1, or that uplink resources and flexible resources that may be used for the sidelink in the sidelink time domain resource configuration information are a subset or a whole set of uplink resources and flexible resources in the semi-static uplink-downlink configuration configured in the SIB 1.

Case 8

If the SCS of the uplink-downlink configuration information or the sidelink time domain configuration information is indicated in addition to the uplink-downlink configuration information or the sidelink time domain configuration information, it indicates that the uplink-downlink configuration information or the sidelink time domain configuration information is defined based on the SCS. For example, if the sidelink SIB or the sidelink RRC carries the uplink-downlink configuration, the sidelink SIB or the sidelink RRC may further carry an SCS configuration of the uplink-downlink configuration. After obtaining the uplink-downlink configuration and the SCS configuration, the terminal considers that the uplink-downlink configuration should be interpreted based on the SCS.

Another possibility is that if the SCS of the uplink-downlink configuration information or the sidelink time domain configuration information is not explicitly indicated, the uplink-downlink configuration information or the sidelink time domain configuration information is determined and interpreted in the following manner:

1. If the configuration is indicated by the sidelink terminal, it is considered that the SCS is an SCS of the signaling carrying the configuration, and the configuration is defined (interpreted) based on the SCS. For example, by using an SCS of the S-SSB, the uplink-downlink configuration information or the sidelink time domain configuration information is defined (interpreted) based on the SCS of the S-SSB.

2. If the configuration is indicated by the LTE network-side device, it is considered that the SCS is 15 kHz, and the uplink-downlink configuration information or the sidelink time domain configuration information is defined (interpreted) based on 15 kHz.

3. If the configuration is indicated by the NR network-side device, it is considered that the SCS is the same as the SCS used for the semi-static uplink-downlink configuration in the SIB1, and the uplink-downlink configuration information or the sidelink time domain configuration information is defined (interpreted) based on the SCS.

Case 9

A sidelink frame number (e.g., DFN, direct frame number) is calculated in the following manner:

Sidelink frame number=Floor((0.1×(Tcurrent−Tref−offsetDFN)/1000) mod 1024); and

Subframe number=Floor((Tcurrent−Tref−offsetDFN)/1000 mod 10).

Manner 1:

Slot number in a frame=Floor((Tcurrent−Tref−offsetDFN−Sidelink frame number×10×1000)/1000×2^u); and Slot number in a subframe=Floor((Tcurrent−Tref−offsetDFN−Sidelink frame number×10×1000−Subframe number×1000)/1000×2^u).

Manner 2:

Slot number in a frame=Floor((Tcurrent−Tref−offsetDFN)/1000×2^u) mod (10×2^u); and Slot number in a subframe=Floor((Tcurrent−Tref−offsetDFN)/1000×2^u) mod (2^u).

When a DFN offset is not considered, the sidelink frame number (DFN) is calculated in the following manner:

Sidelink frame number=Floor((0.1×(Tcurrent−Tref)/1000) mod 1024); and

Subframe number=Floor((Tcurrent−Tref)/1000 mod 10).
Manner 3:
  Slot number in a frame=Floor((Tcurrent−Tref−Sidelink frame number×10×1000)/1000×2^u); and
  Slot number in a subframe=Floor((Tcurrent−Tref−Sidelink frame number×10×1000−Subframe number×1000)/1000×2^u).
Manner 4:
  Slot number in a frame=Floor((Tcurrent−Tref)/1000×2^u) mod (10×2^u); and
  Slot number in a subframe=Floor((Tcurrent−Tref)/1000×2^u) mod (2^u).
Manner 5:
  In a subframe pool, a number of a current slot is nss=$2^u$×nssf+i, where i is a number of the slot in a current SL subframe, and $n_{ssf}$ is a number of the SL subframe. The number of the SL subframe is $n_{ssf}$=k mod 10, where k is a relative number of the SL subframe in allocated sidelink resources.

It should be noted that, in the foregoing formula, Tcurrent is a current time, Tref is a reference time, offsetDFN is a DFN offset, u=log 2(SCS/15 kHz), 2^u is the $u^{th}$ power of 2, and 2^u=SCS/15 kHz. Floor indicates rounddown, and mod indicates a modulo operation.

It should be noted that the sidelink SIB and sidelink RRC mentioned in some embodiments of this disclosure are distinguished based on whether the transmit end is the network-side device or the terminal.

It should be noted that some embodiments of this disclosure can help the sidelink terminal determine the available sidelink resource configuration information, and reduce interference between the sidelink terminal and Uu transmission, or reduce mutual interference between the sidelink terminal and another sidelink terminal, and can ensure reliability of sidelink transmission of the terminal.

Figure 16:
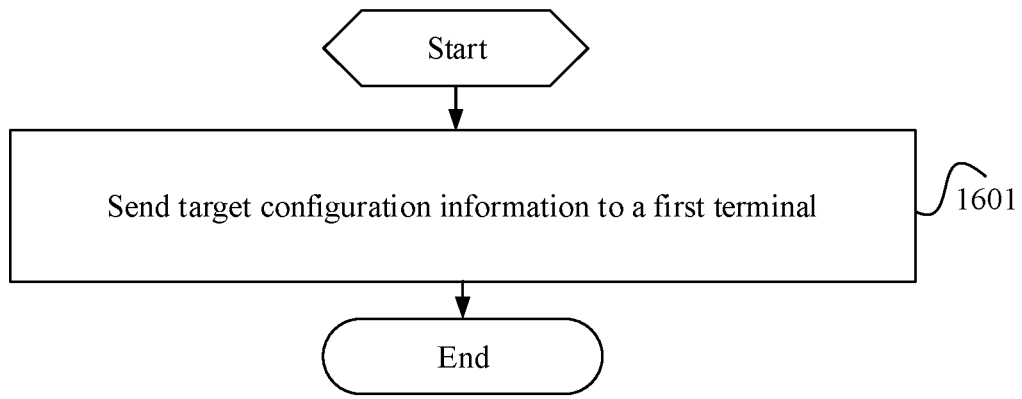
FIG. 16 presents a schematic flowchart of an information sending method according to some embodiments of this disclosure.

As shown in FIG. 16, some embodiments of this disclosure further provide an information sending method, applied to a target device, where the target device is a network-side device or a second terminal (it should be noted that the second terminal is a terminal that can directly communicate with a first terminal, other than the first terminal), and the method includes:

Step 1601: Send target configuration information to a first terminal.

Optionally, the target configuration information includes uplink-downlink configuration information or sidelink time domain configuration information; and step 1601 is used to implement at least one of the following manners:
  sending identification information corresponding to the target configuration information to the first terminal; and
  sending attribute information corresponding to the target configuration information to the first terminal.

Specifically, the attribute information includes at least one of the following information:
  a period;
  indication information of downlink resources;
  indication information of uplink resources;
  indication information of flexible resources;
  indication information of uplink resources and flexible resources;
  indication information of downlink resources and flexible resources;
  indication information of sidelink resources; and
  a numerical configuration.

Further, the indication information includes at least one of the number of resources or a resource bitmap.

Further, the numerical configuration includes at least one of a subcarrier spacing or a cyclic prefix type.

Optionally, the target configuration information includes uplink-downlink configuration information or sidelink time domain configuration information; and the information sending method further includes:
  sending time offset information to the first terminal, where
    the time offset information includes at least one of a time offset of a resource configured in the target configuration information or a time offset in sidelink time domain resource configuration information.

Optionally, the target configuration information includes sidelink timing information, where
  the sidelink timing information includes at least one of a sidelink frame number, a subframe identifier, or a slot identifier.

Specifically, the target configuration information includes at least one of uplink-downlink configuration information, sidelink time domain configuration information, uplink bandwidth configuration information, sidelink bandwidth configuration information, sidelink synchronization resource information, or sidelink timing information.

Optionally, the sending target configuration information to a first terminal includes:
  sending the target configuration information to the first terminal by using a second target message, where
    the second target message includes at least one of a system information block SIB or radio resource control RRC signaling.

It should be noted that all descriptions of the device side in the foregoing embodiments are applicable to the embodiments of the information sending method for the target device, with a technical effect achieved.

Figure 17:
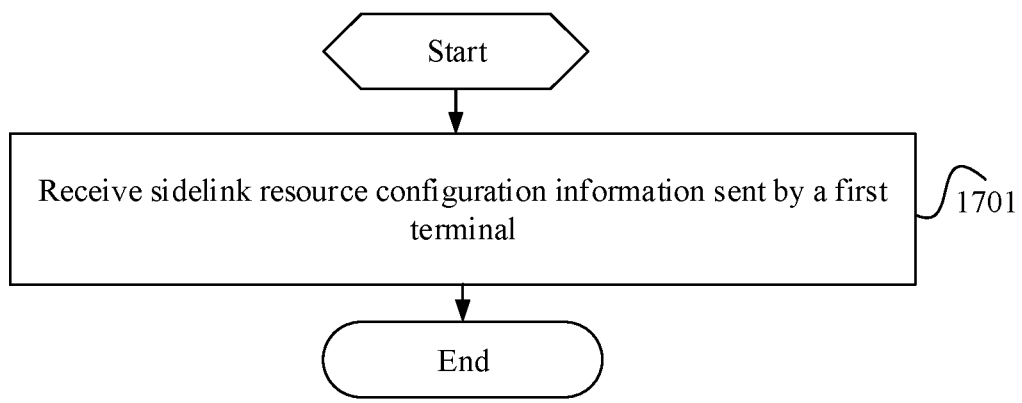
FIG. 17 presents a schematic flowchart of a resource configuration obtaining method according to some embodiments of this disclosure.

As shown in FIG. 17, some embodiments of this disclosure further provide a resource configuration obtaining method, applied to a third terminal and including:

Step 1701: Receive sidelink resource configuration information sent by a first terminal.

Optionally, the sidelink resource configuration information includes sidelink time domain resource configuration information; and step 1701 is used to implement at least one of the following manners:
  receiving a configuration identifier corresponding to the sidelink time domain resource configuration information and sent by the first terminal; and
  receiving attribute information corresponding to the sidelink time domain resource configuration information and sent by the first terminal.

Specifically, the attribute information includes at least one of the following information:
  a period;
  indication information of downlink resources;
  indication information of uplink resources;
  indication information of flexible resources;
  indication information of uplink resources and flexible resources;
  indication information of downlink resources and flexible resources;
  indication information of sidelink resources; and
  a numerical configuration.

Further, the indication information includes at least one of the number of resources or a resource bitmap.

Further, the numerical configuration includes at least one of a subcarrier spacing or a cyclic prefix type.

Optionally, the sidelink resource configuration information includes sidelink time domain resource configuration information; and the method further includes:

obtaining time offset information, where
the time offset information includes at least one of a time offset of a resource configured in target configuration information or a time offset in the sidelink time domain resource configuration information.

Optionally, a specific implementation of the receiving sidelink resource configuration information sent by a first terminal is:
receiving the sidelink resource configuration information sent by the first terminal by using a first target message, where
the first target message includes at least one of a physical sidelink broadcast channel (PSBCH), a sidelink system information block (SIB), or sidelink radio resource control (RRC) signaling.

Optionally, the resource configuration obtaining method further includes:
receiving auxiliary information about the sidelink resource configuration information and indicated by the first terminal.

Further, the auxiliary information is used to indicate at least one of the following information:
a manner of interpreting the sidelink resource configuration information;
type information of a target network-side device based on which sidelink time domain resource configuration information is obtained;
information about a synchronization source of the first terminal; and
a type of target configuration information based on which the sidelink time domain resource configuration information is obtained.

Further, an indication manner of the auxiliary information includes at least one of an explicit indication manner or an implicit indication manner, where
the explicit indication manner is: using a preset bit for indication; and
the implicit indication manner is: using different synchronization signals or reference signals to indicate sidelink time domain resource configuration information.

Specifically, the sidelink resource configuration information includes at least one of sidelink time domain resource configuration information, sidelink frequency domain resource configuration information, sidelink synchronization resource configuration information, or sidelink timing configuration information.

It should be noted that all descriptions of the third terminal in the foregoing embodiments are applicable to the embodiments of the resource configuration obtaining method for the third terminal, with a technical effect achieved.

Figure 18:
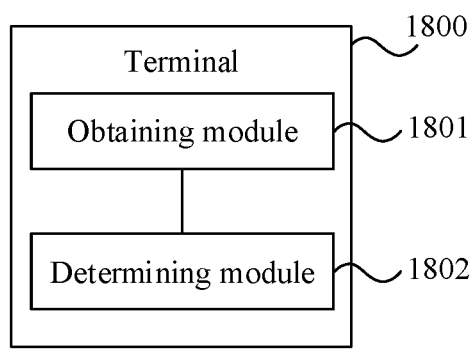
FIG. 18 presents a first schematic modular diagram of a terminal according to some embodiments of this disclosure.

As shown in FIG. 18, some embodiments of this disclosure further provide a terminal 1800, where the terminal is a first terminal and includes:
an obtaining module 1801, configured to obtain target configuration information; and
a determining module 1802, configured to determine sidelink resource configuration information based on the target configuration information.

Optionally, the target configuration information includes uplink-downlink configuration information; the sidelink resource configuration information includes sidelink time domain resource configuration information; and the determining module 1802 is configured to:
determine the sidelink time domain resource configuration information based on at least a part of resources that are indicated by the uplink-downlink configuration information and are usable for sidelink transmission.

Optionally, the target configuration information includes sidelink time domain configuration information; the sidelink resource configuration information includes sidelink time domain resource configuration information; and the determining module 1802 is configured to:
determine the sidelink time domain resource configuration information based on at least a part of resources in the sidelink time domain configuration information.

Optionally, the target configuration information includes uplink-downlink configuration information or sidelink time domain configuration information; and the obtaining module 1801 is configured to implement at least one of the following manners:
obtaining the target configuration information based on identification information corresponding to the target configuration information; and
obtaining the target configuration information based on attribute information of the target configuration information.

Optionally, the sidelink resource configuration information includes sidelink time domain resource configuration information; and after the determining module 1802 determines the sidelink resource configuration information based on the target configuration information, the terminal further includes at least one of the following modules:
a first sending module, configured to send a configuration identifier corresponding to the sidelink time domain resource configuration information; and
a second sending module, configured to send attribute information corresponding to the sidelink time domain resource configuration information.

Further, the attribute information includes at least one of the following information:
a period;
indication information of downlink resources;
indication information of uplink resources;
indication information of flexible resources;
indication information of uplink resources and flexible resources;
indication information of downlink resources and flexible resources;
indication information of sidelink resources; and
a numerical configuration.

Specifically, the indication information includes at least one of the number of resources or a resource bitmap.

Specifically, the numerical configuration includes at least one of a subcarrier spacing or a cyclic prefix type.

Optionally, the target configuration information includes uplink-downlink configuration information or sidelink time domain configuration information; the sidelink resource configuration information includes sidelink time domain resource configuration information; and before the determining module 1802 determines the sidelink resource configuration information based on the target configuration information, the terminal further includes:
a first offset obtaining module, configured to obtain time offset information, where
the time offset information includes at least one of a time offset of a resource configured in the target configuration information or a time offset in the sidelink time domain resource configuration information.

Optionally, the sidelink resource configuration information includes sidelink time domain resource configuration information; and after the determining module 1802 determines the sidelink resource configuration information based on the target configuration information, the terminal further includes:
a first offset sending module, configured to send time offset information, where
the time offset information includes at least one of a time offset of a resource configured in the target configuration information or a time offset in the sidelink time domain resource configuration information.

Optionally, after the determining module 1802 determines the sidelink resource configuration information based on the target configuration information, the terminal further includes:
a third sending module, configured to send the sidelink resource configuration information in a first target message, where
the first target message includes at least one of a physical sidelink broadcast channel (PSBCH), a sidelink system information block (SIB), or sidelink radio resource control (RRC) signaling.

Optionally, after the determining module 1802 determines the sidelink resource configuration information based on the target configuration information, the terminal further includes:
an indication module, configured to indicate auxiliary information about the sidelink resource configuration information.

Specifically, the auxiliary information is used to indicate at least one of the following information:
a manner of interpreting the sidelink resource configuration information;
type information of a target network-side device based on which sidelink time domain resource configuration information is obtained;
information about a synchronization source of the first terminal; and
a type of the target configuration information based on which the sidelink time domain resource configuration information is obtained.

Specifically, an indication manner of the auxiliary information includes at least one of an explicit indication manner or an implicit indication manner, where
the explicit indication manner is: using a preset bit for indication; and
the implicit indication manner is: using different synchronization signals or reference signals to indicate the sidelink time domain resource configuration information.

Optionally, the target configuration information includes uplink bandwidth configuration information or sidelink bandwidth configuration information; the sidelink resource configuration information includes sidelink frequency domain resource configuration information; and the determining module 1802 is configured to:
determine the sidelink frequency domain resource configuration information based on at least a part of resources in the target configuration information.

Optionally, the target configuration information includes sidelink synchronization resource information; and the determining module 1802 is configured to:
determine sidelink synchronization resource configuration information in the sidelink resource configuration information based on the sidelink synchronization resource information.

Optionally, the target configuration information includes sidelink synchronization resource information; and the terminal further includes:
a resource pool determining module, configured to determine a sidelink resource pool, where
the sidelink resource pool does not include a sidelink synchronization resource indicated in the sidelink synchronization resource information.

Further, the target configuration information includes sidelink synchronization resource information, and a synchronization resource indicated in the sidelink synchronization resource information is not used for sidelink transmission.

Optionally, the sidelink resource configuration information includes sidelink timing configuration information; and the target configuration information includes sidelink timing information, where the sidelink timing information includes at least one of a sidelink frame number, a subframe identifier, or a slot identifier.

Specifically, the target configuration information includes at least one of uplink-downlink configuration information, sidelink time domain configuration information, uplink bandwidth configuration information, sidelink bandwidth configuration information, sidelink synchronization resource information, or sidelink timing information.

Optionally, the obtaining module 1801 is configured to implement at least one of the following manners:
obtaining target configuration information sent by a network-side device by using a second target message;
obtaining preconfigured target configuration information;
obtaining target configuration information indicated by a terminal other than the first terminal; and
obtaining target configuration information prescribed by a protocol.

Specifically, the second target message includes at least one of a system information block (SIB) or radio resource control (RRC) signaling.

Optionally, the determining module 1802 is configured to implement at least one of the following manners:
determining the sidelink resource configuration information based on latest obtained target configuration information; and
when at least two pieces of target configuration information are obtained, determining the sidelink resource configuration information based on at least a part of information in the at least two pieces of target configuration information.

Further, a specific implementation of determining the sidelink resource configuration information based on at least a part of information in the at least two pieces of target configuration information includes one of the following manners:
determining the sidelink resource configuration information based on at least a part of resources in a union set of resources in the at least two pieces of target configuration information; and
determining the sidelink resource configuration information based on first information in the at least two pieces of target configuration information, where
the union set of resources includes time domain resources usable for sidelink transmission in the at least two pieces of target configuration information; the first information is a piece of target configuration information that meets a preset condition in the at least two pieces of target configuration information; and
the preset condition includes: time domain resources usable for sidelink transmission are most, or time domain resources usable for sidelink transmission are fewest.

It should be noted that this terminal embodiment is the terminal corresponding to the foregoing resource configuration method applied to the first terminal. All implementations in the foregoing embodiments are applicable to this terminal embodiment, with a technical effect achieved.

Figure 19:
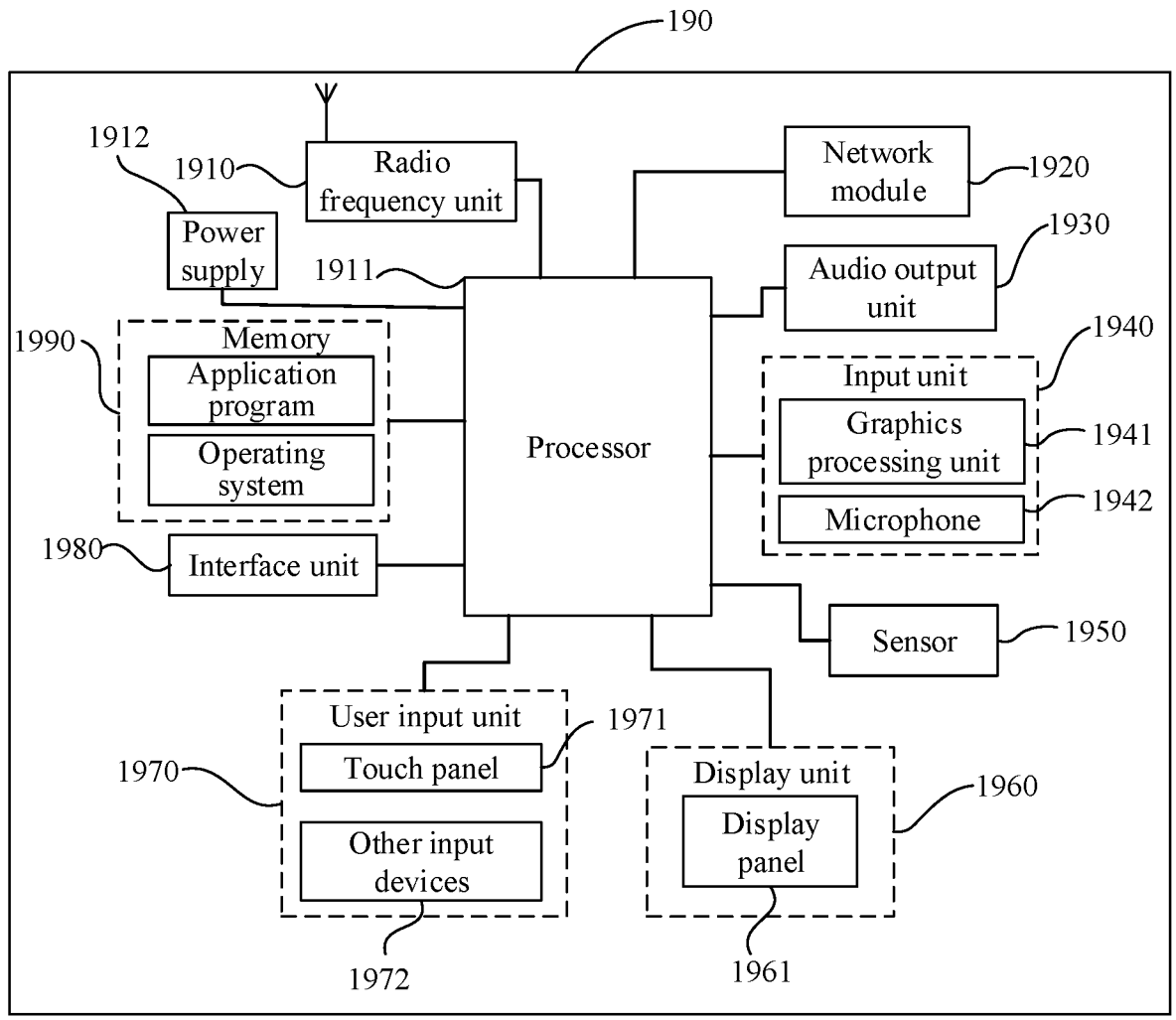
FIG. 19 presents a first schematic structural diagram of a terminal according to some embodiments of this disclosure.

FIG. 19 is a schematic diagram of a hardware structure of a terminal for implementing some embodiments of this disclosure.

The terminal 190 includes but is not limited to components such as a radio frequency unit 1910, a network module 1920, an audio output unit 1930, an input unit 1940, a sensor 1950, a display unit 1960, a user input unit 1970, an interface unit 1980, a memory 1990, a processor 1911, and a power supply 1912. A person skilled in the art may understand that the structure of the terminal shown in FIG. 19 does not constitute a limitation on the terminal. A quantity of components included in the terminal may be greater or less than that shown in the figure, or some components are combined, or component arrangements are different. In some embodiments of this disclosure, the terminal includes but is not limited to a mobile phone, a tablet computer, a laptop computer, a palmtop computer, an in-vehicle terminal, a wearable device, a pedometer, and the like.

The processor 1911 is configured to obtain target configuration information, and determine sidelink resource configuration information based on the target configuration information.

It should be understood that, in some embodiments of this disclosure, the radio frequency unit 1910 may be configured to send and receive signals in an information sending and receiving process or in a call process. Specifically, after receiving downlink data from a network-side device, the radio frequency unit 1910 sends the downlink data to the processor 1911 for processing, and in addition, sends uplink data to the network-side device. Generally, the radio frequency unit 1910 includes but is not limited to an antenna, at least one amplifier, a transceiver, a coupler, a low noise amplifier, a duplexer, and the like. In addition, the radio frequency unit 1910 may further communicate with a network and another device through a wireless communications system.

The terminal provides wireless broadband Internet access for a user by using the network module 1920, for example, helps the user send and receive e-mails, browse web pages, and access streaming media.

The audio output unit 1930 may convert audio data received by the radio frequency unit 1910 or the network module 1920 or stored in the memory 1990 into an audio signal, and output the audio signal as a sound. In addition, the audio output unit 1930 may further provide an audio output (for example, a call signal received sound or a message received sound) related to a specific function performed by the terminal 190. The audio output unit 1930 includes a speaker, a buzzer, a phone receiver, and the like.

The input unit 1940 is configured to receive an audio or video signal. The input unit 1940 may include a graphics processing unit (GPU) 1941 and a microphone 1942. The graphics processing unit 1941 processes image data of a still picture or a video obtained by an image capture apparatus (for example, a camera) in an image capture mode or a video capture mode. A processed image frame may be displayed on the display unit 1960. An image frame processed by the graphics processing unit 1941 may be stored in the memory 1990 (or another storage medium) or sent by the radio frequency unit 1910 or the network module 1920. The microphone 1942 can receive a sound and can process the sound into audio data. The processed audio data may be converted in a telephone call mode into a format that can be sent to a mobile communications network-side device through the radio frequency unit 1910, for outputting.

The terminal 190 further includes at least one sensor 1950, for example, an optical sensor, a motion sensor, and another sensor. Specifically, the optical sensor includes an ambient light sensor and a proximity sensor. The ambient light sensor may adjust luminance of a display panel 1961 based on brightness of ambient light. The proximity sensor may turn off the display panel 1961 and/or backlight when the terminal 190 moves to an ear. As a type of motion sensor, an accelerometer sensor can detect magnitudes of accelerations in all directions (usually three axes), can detect a magnitude and a direction of gravity when the terminal is in a stationary state, and can be applied to terminal posture recognition (such as screen switching between portrait and landscape, related games, and magnetometer posture calibration), functions related to vibration recognition (such as pedometer and tapping), and the like. The sensor 1950 may further include a fingerprint sensor, a pressure sensor, an iris sensor, a molecular sensor, a gyroscope, a barometer, a hygrometer, a thermometer, an infrared sensor, and the like. Details are not described herein.

The display unit 1960 is configured to display information input by the user or information provided for the user. The display unit 1960 may include the display panel 1961. The display panel 1961 may be configured in a form of a liquid crystal display (LCD), an organic light-emitting diode (OLED), or the like.

The user input unit 1970 may be configured to receive input digit or character information, and generate a key signal input related to a user setting and function control of the terminal. Specifically, the user input unit 1970 includes a touch panel 1971 and other input devices 1972. The touch panel 1971, also referred to as a touchscreen, may capture a touch operation performed by the user on or near the touch panel (for example, an operation performed by the user on the touch panel 1971 or near the touch panel 1971 by using any appropriate object or accessory such as a finger or a stylus). The touch panel 1971 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 1911, and receives and executes a command sent by the processor 1911. In addition, the touch panel 1971 may be implemented in a plurality of forms, for example, a resistive, capacitive, infrared, or surface acoustic wave touch panel. The user input unit 1970 may further include the other input devices 1972 in addition to the touch panel 1971. Specifically, the other input devices 1972 may include but are not limited to a physical keyboard, a function key (such as a volume control key or a power on/off key), a trackball, a mouse, a joystick, and the like. Details are not described herein.

Further, the touch panel 1971 may cover the display panel 1961. After the touch panel 1971 detects a touch operation on or near the touch panel, the touch panel 1971 transmits the touch operation to the processor 1911 to determine a type of a touch event. Then the processor 1911 provides a corresponding visual output on the display panel 1961 based on the type of the touch event. Although the touch panel 1971 and the display panel 1961 are used as two independent components to implement input and output functions of the terminal in FIG. 19, the touch panel 1971 and the display panel 1961 may be integrated to implement the input and output functions of the terminal in some embodiments. This is not specifically limited herein.

The interface unit 1980 is an interface for connecting an external apparatus to the terminal 190. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 1980 may be configured to receive an input (for example, data information or power) from an external apparatus, and transmit the received input to one or more components in the terminal 190, or may be configured to transmit data between the terminal 190 and an external apparatus.

The memory 1990 may be configured to store a software program and various data. The memory 1990 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 1990 may include a high-speed random access memory, or may include a non-volatile memory, for example, at least one magnetic disk storage device, a flash memory, or other non-volatile solid-state storage devices.

The processor 1911 is a control center of the terminal. The processor 1911 uses various interfaces and lines to connect all parts of the entire terminal, and performs various functions and data processing of the terminal by running or executing the software program and/or module stored in the memory 1990 and invoking data stored in the memory 1990, thereby performing overall monitoring on the terminal. The processor 1911 may include one or more processing units. Optionally, the processor 1911 may integrate an application processor and a modem processor. The application processor mainly processes the operating system, a user interface, an application program, and the like. The modem processor mainly processes wireless communication. It may be understood that the modem processor may alternatively not be integrated into the processor 1911.

The terminal 190 may further include the power supply 1912 (for example, a battery) supplying power to all components. Optionally, the power supply 1912 may be logically connected to the processor 1911 through a power management system. In this way, functions such as charge management, discharge management, and power consumption management are implemented by using the power management system.

In addition, the terminal 190 includes some functional modules that are not illustrated. Details are not described herein.

Optionally, some embodiments of this disclosure further provide a terminal, including a processor 1911, a memory 1990, and a program stored in the memory 1990 and capable of running on the processor 1911. When the program is executed by the processor 1911, each process of the foregoing embodiment of the resource configuration method applied to the terminal side is implemented, with a same technical effect achieved. To avoid repetition, details are not described herein again.

Some embodiments of this disclosure further provide a computer-readable storage medium, where the computer-readable storage medium stores a computer program. When the computer program is executed by a processor, each process of the foregoing embodiment of the resource configuration method applied to the terminal side is implemented, with a same technical effect achieved. To avoid repetition, details are not described herein again. The computer-readable storage medium is, for example, a read-only memory (ROM), a random access memory (RAM), a magnetic disk, or an optical disc.

Figure 20:
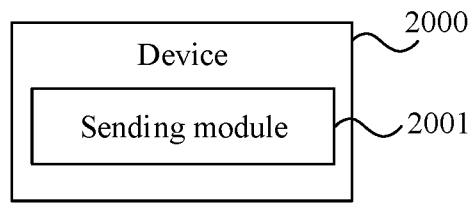
FIG. 20 presents a schematic modular diagram of a device according to some embodiments of this disclosure.

As shown in FIG. 20, some embodiments of this disclosure further provide a device 2000, where the device is a target device, the target device is a network-side device or a second terminal, and the device includes:

a sending module 2001, configured to send target configuration information to a first terminal.

Optionally, the target configuration information includes uplink-downlink configuration information or sidelink time domain configuration information; and the sending module 2001 is configured to implement at least one of the following manners:

sending identification information corresponding to the target configuration information to the first terminal; and sending attribute information corresponding to the target configuration information to the first terminal.

Specifically, the attribute information includes at least one of the following information:

a period;

indication information of downlink resources;

indication information of uplink resources;

indication information of flexible resources;

indication information of uplink resources and flexible resources;

indication information of downlink resources and flexible resources;

indication information of sidelink resources; and a numerical configuration.

Further, the indication information includes at least one of the number of resources or a resource bitmap.

Further, the numerical configuration includes at least one of a subcarrier spacing or a cyclic prefix type.

Optionally, the target configuration information includes uplink-downlink configuration information or sidelink time domain configuration information; and the device 2000 further includes:

a second offset sending module, configured to send time offset information to the first terminal, where the time offset information includes at least one of a time offset of a resource configured in the target configuration information or a time offset in sidelink time domain resource configuration information.

Optionally, the target configuration information includes sidelink timing information, where the sidelink timing information includes at least one of a sidelink frame number, a subframe identifier, or a slot identifier.

Specifically, the target configuration information includes at least one of uplink-downlink configuration information, sidelink time domain configuration information, uplink bandwidth configuration information, sidelink bandwidth configuration information, sidelink synchronization resource information, or sidelink timing information.

Optionally, the sending module 2001 is configured to:

send the target configuration information to the first terminal by using a second target message, where the second target message includes at least one of a system information block SIB or radio resource control RRC signaling.

It should be noted that this network-side device embodiment is the device corresponding to the foregoing information sending method applied to the device. All implementations in the foregoing embodiments are applicable to this device embodiment, with a technical effect achieved.

Figure 21:
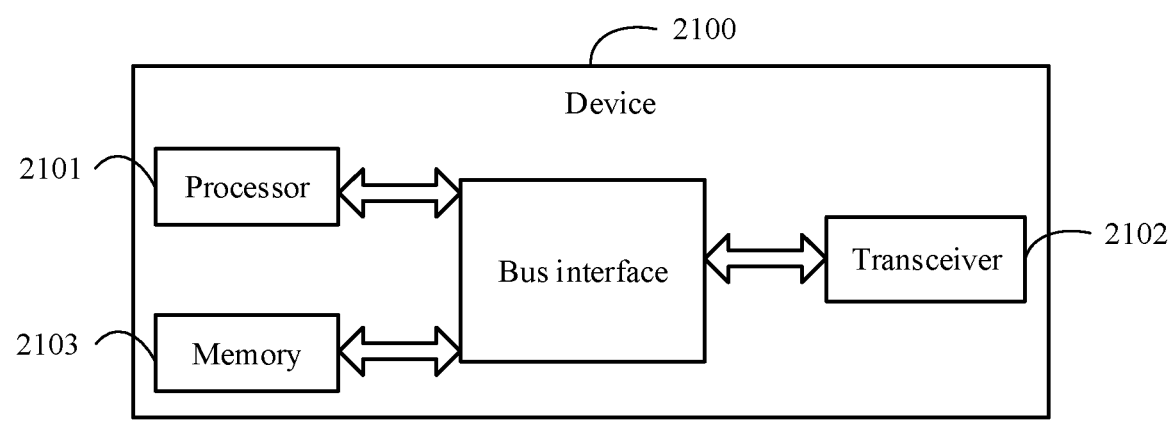
FIG. 21 presents a schematic structural diagram of a device according to some embodiments of this disclosure.

FIG. 21 is a structural diagram of a device according to an embodiment of this disclosure. Details of the foregoing information sending method applied to the device can be implemented, with a same effect achieved, where the device is a target device, and the target device is a network-side device or a second terminal. As shown in FIG. 21, the device 2100 includes a processor 2101, a transceiver 2102, a memory 2103, and a bus interface.

The processor 2101 is configured to read a program in the memory 2103 to perform the following process:

sending target configuration information to a first terminal by using the transceiver 2102.

In FIG. 21, a bus architecture may include any quantity of interconnect buses and bridges, specifically for interconnecting various circuits of one or more processors represented by the processor 2101 and a memory represented by the memory 2103. The bus architecture may further interconnect various other circuits such as a peripheral device, a voltage regulator, and a power management circuit. These are all well known in the art, and therefore are not further described in this specification. The bus interface provides an interface. The transceiver 2102 may be a plurality of components, that is, the transceiver 2102 includes a transmitter and a receiver, and provides a unit for communicating with various other apparatuses on a transmission medium.

Optionally, the target configuration information includes uplink-downlink configuration information or sidelink time domain configuration information; and the processor 2101 is configured to read the program in the memory 2103 to send the target configuration information to the first terminal by performing at least one of the following manners:

sending identification information corresponding to the target configuration information to the first terminal; and sending attribute information corresponding to the target configuration information to the first terminal.

Specifically, the attribute information includes at least one of the following information:

a period;

indication information of downlink resources;

indication information of uplink resources;

indication information of flexible resources;

indication information of uplink resources and flexible resources;

indication information of downlink resources and flexible resources;

indication information of sidelink resources; and a numerical configuration.

Further, the indication information includes at least one of the number of resources or a resource bitmap.

Further, the numerical configuration includes at least one of a subcarrier spacing or a cyclic prefix type.

Optionally, the target configuration information includes uplink-downlink configuration information or sidelink time domain configuration information; and the processor 2101 is configured to read the program in the memory 2103 to further perform the following process:

sending time offset information to the first terminal, where the time offset information includes at least one of a time offset of a resource configured in the target configuration information or a time offset in sidelink time domain resource configuration information.

Optionally, the target configuration information includes sidelink timing information, where the sidelink timing information includes at least one of a sidelink frame number, a subframe identifier, or a slot identifier.

Specifically, the target configuration information includes at least one of uplink-downlink configuration information, sidelink time domain configuration information, uplink bandwidth configuration information, sidelink bandwidth configuration information, sidelink synchronization resource information, or sidelink timing information.

Optionally, the processor 2101 is configured to read the program in the memory 2103 to send the target configuration information to the first terminal by performing the following process:

sending the target configuration information to the first terminal by using a second target message, where the second target message includes at least one of a system information block SIB or radio resource control RRC signaling.

Some embodiments of this disclosure further provide a device, where the device is a target device, the target device is a network-side device or a second terminal, and the device includes a memory, a processor, and a program stored in the memory and capable of running on the processor, where when the program is executed by the processor, each process of the information sending method embodiment is implemented, with a same technical effect achieved. To avoid repetition, details are not described herein again.

Some embodiments of this disclosure further provide a computer-readable storage medium, where the computer-readable storage medium stores a computer program, and when the computer program is executed by a processor, each process of the foregoing embodiment of the information sending method is implemented, with a same technical effect achieved. To avoid repetition, details are not described herein again. The computer-readable storage medium is, for example, a read-only memory (ROM), a random access memory (RAM), a magnetic disk, or an optical disc.

When the target device is a network-side device, the network-side device may be a base transceiver station (BTS) in a Global System for Mobile Communications (GSM) or Code Division Multiple Access (CDMA), or may be a NodeB (NB) in Wideband Code Division Multiple Access (WCDMA), or may be an evolved NodeB (eNB or eNodeB for short), a relay station, or an access point in LTE, or may be a base station in a future 5G network, or the like, and is not limited herein.

Figure 22:
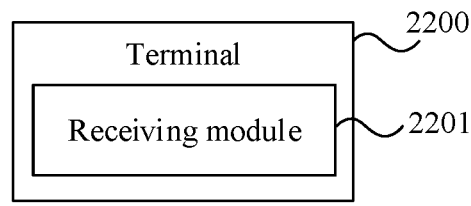
FIG. 22 presents a second schematic modular diagram of a terminal according to some embodiments of this disclosure.

As shown in FIG. 22, some embodiments of this disclosure further provide a terminal 2200, where the terminal is a third terminal and includes:

a receiving module 2201, configured to receive sidelink resource configuration information sent by a first terminal.

Optionally, the sidelink resource configuration information includes sidelink time domain resource configuration information; and the receiving module 2201 is configured to implement at least one of the following manners:

receiving a configuration identifier corresponding to the sidelink time domain resource configuration information and sent by the first terminal; and receiving attribute information corresponding to the sidelink time domain resource configuration information and sent by the first terminal.

Specifically, the attribute information includes at least one of the following information:
  a period;
  indication information of downlink resources;
  indication information of uplink resources;
  indication information of flexible resources;
  indication information of uplink resources and flexible resources;
  indication information of downlink resources and flexible resources;
  indication information of sidelink resources; and
  a numerical configuration.

Further, the indication information includes at least one of the number of resources or a resource bitmap.

Further, the numerical configuration includes at least one of a subcarrier spacing or a cyclic prefix type.

Optionally, the sidelink resource configuration information includes sidelink time domain resource configuration information; and the terminal 2200 further includes:
  a second offset obtaining module, configured to obtain time offset information, where
  the time offset information includes at least one of a time offset of a resource configured in target configuration information or a time offset in the sidelink time domain resource configuration information.

Optionally, the receiving module 2201 is configured to:
  receive the sidelink resource configuration information sent by the first terminal by using a first target message, where
  the first target message includes at least one of a physical sidelink broadcast channel PSBCH, a sidelink system information block SIB, or sidelink radio resource control RRC signaling.

Optionally, the terminal 2200 further includes:
  a first receiving module, configured to receive auxiliary information about the sidelink resource configuration information and indicated by the first terminal.

Further, the auxiliary information is used to indicate at least one of the following information:
  a manner of interpreting the sidelink resource configuration information;
  type information of a target network-side device based on which sidelink time domain resource configuration information is obtained;
  information about a synchronization source of the first terminal; and
  a type of target configuration information based on which the sidelink time domain resource configuration information is obtained.

Further, an indication manner of the auxiliary information includes at least one of an explicit indication manner or an implicit indication manner, where
  the explicit indication manner is: using a preset bit for indication; and
  the implicit indication manner is: using different synchronization signals or reference signals to indicate sidelink time domain resource configuration information.

Specifically, the sidelink resource configuration information includes at least one of sidelink time domain resource configuration information, sidelink frequency domain resource configuration information, sidelink synchronization resource configuration information, or sidelink timing configuration information.

It should be noted that this terminal embodiment is the terminal corresponding to the foregoing resource configuration obtaining method applied to the third terminal. All implementations in the foregoing embodiments are applicable to this terminal embodiment, with a technical effect achieved.

Figure 23:
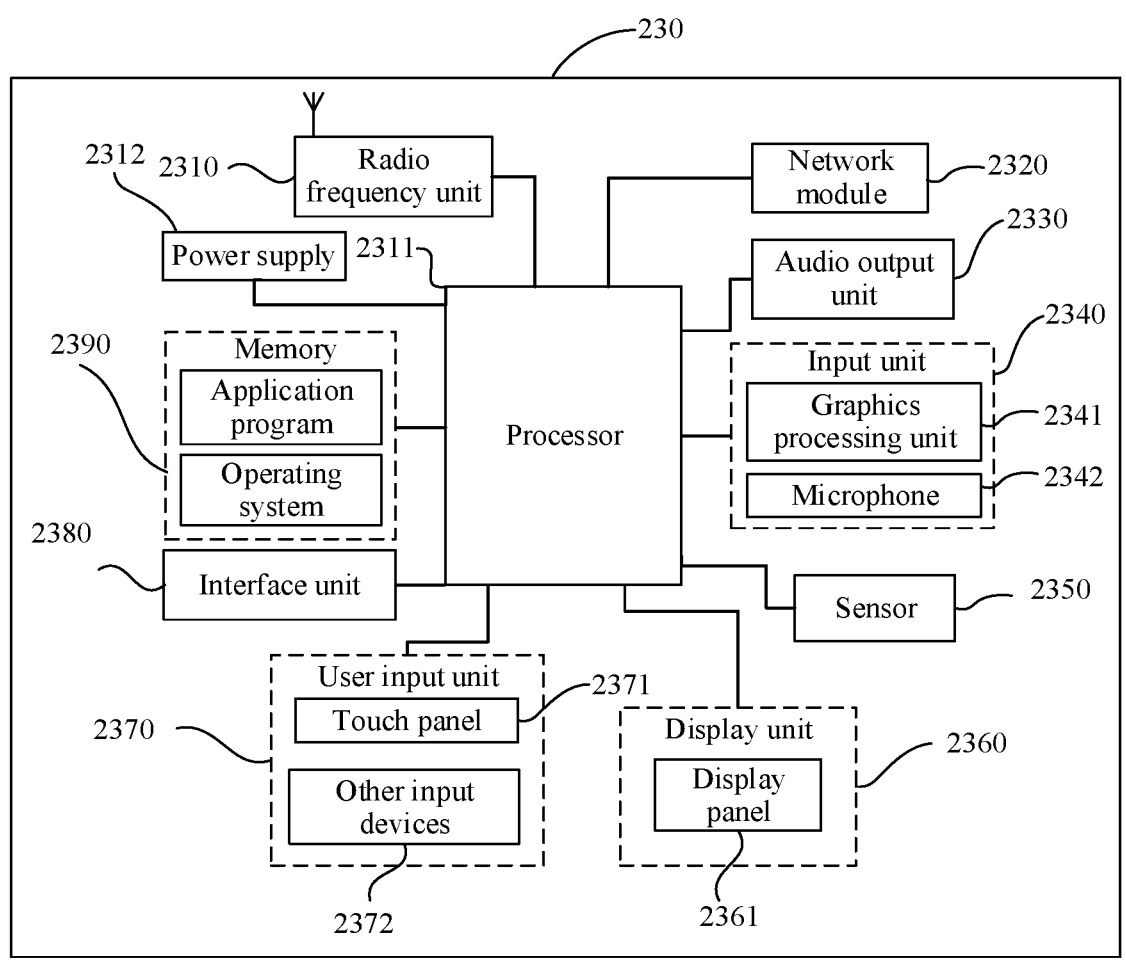
FIG. 23 presents a second schematic structural diagram of a terminal according to some embodiments of this disclosure.

FIG. 23 is a schematic diagram of a hardware structure of a terminal for implementing some embodiments of this disclosure.

The terminal 230 includes but is not limited to components such as a radio frequency unit 2310, a network module 2320, an audio output unit 2330, an input unit 2340, a sensor 2350, a display unit 2360, a user input unit 2370, an interface unit 2380, a memory 2390, a processor 2311, and a power supply 2312. A person skilled in the art may understand that the structure of the terminal shown in FIG. 23 does not constitute a limitation on the terminal. A quantity of components included in the terminal may be greater or less than that shown in the figure, or some components are combined, or component arrangements are different. In some embodiments of this disclosure, the terminal includes but is not limited to a mobile phone, a tablet computer, a laptop computer, a palmtop computer, an in-vehicle terminal, a wearable device, a pedometer, and the like.

The radio frequency unit 2310 is configured to receive sidelink resource configuration information sent by a first terminal.

It should be understood that, in some embodiments of this disclosure, the radio frequency unit 2310 may be configured to send and receive signals in an information sending and receiving process or in a call process. Specifically, after receiving downlink data from a network-side device, the radio frequency unit 2310 sends the downlink data to the processor 2311 for processing, and in addition, sends uplink data to the network-side device. Generally, the radio frequency unit 2310 includes but is not limited to an antenna, at least one amplifier, a transceiver, a coupler, a low noise amplifier, a duplexer, and the like. In addition, the radio frequency unit 2310 may further communicate with a network and another device through a wireless communications system.

The terminal provides wireless broadband Internet access for a user by using the network module 2320, for example, helps the user send and receive e-mails, browse web pages, and access streaming media.

The audio output unit 2330 may convert audio data received by the radio frequency unit 2310 or the network module 2320 or stored in the memory 2390 into an audio signal, and output the audio signal as a sound. In addition, the audio output unit 2330 may further provide an audio output (for example, a call signal received sound or a message received sound) related to a specific function performed by the terminal 230. The audio output unit 2330 includes a speaker, a buzzer, a phone receiver, and the like.

The input unit 2340 is configured to receive an audio or video signal. The input unit 2340 may include a graphics processing unit (GPU) 2341 and a microphone 2342. The graphics processing unit 2341 processes image data of a still picture or a video obtained by an image capture apparatus (for example, a camera) in an image capture mode or a video capture mode. A processed image frame may be displayed on the display unit 2360. An image frame processed by the graphics processing unit 2341 may be stored in the memory 2390 (or another storage medium) or sent by the radio frequency unit 2310 or the network module 2320. The microphone 2342 can receive a sound and can process the sound into audio data. The processed audio data may be converted in a telephone call mode into a format that can be sent to a mobile communications network-side device through the radio frequency unit 2310, for outputting.

The terminal 230 further includes at least one sensor 2350, for example, an optical sensor, a motion sensor, and another sensor. Specifically, the optical sensor includes an ambient light sensor and a proximity sensor. The ambient light sensor may adjust luminance of a display panel 2361 based on brightness of ambient light. The proximity sensor may turn off the display panel 2361 and/or backlight when the terminal 230 moves to an ear. As a type of motion sensor, an accelerometer sensor can detect magnitudes of accelerations in all directions (usually three axes), can detect a magnitude and a direction of gravity when the terminal is in a stationary state, and can be applied to terminal posture recognition (such as screen switching between portrait and landscape, related games, and magnetometer posture calibration), functions related to vibration recognition (such as pedometer and tapping), and the like. The sensor 2350 may further include a fingerprint sensor, a pressure sensor, an iris sensor, a molecular sensor, a gyroscope, a barometer, a hygrometer, a thermometer, an infrared sensor, and the like. Details are not described herein.

The display unit 2360 is configured to display information input by the user or information provided for the user. The display unit 2360 may include the display panel 2361. The display panel 2361 may be configured in a form of a liquid crystal display (LCD), an organic light-emitting diode (OLED), or the like.

The user input unit 2370 may be configured to receive input digit or character information, and generate a key signal input related to a user setting and function control of the terminal. Specifically, the user input unit 2370 includes a touch panel 2371 and other input devices 2372. The touch panel 2371, also referred to as a touchscreen, may capture a touch operation performed by the user on or near the touch panel (for example, an operation performed by the user on the touch panel 2371 or near the touch panel 2371 by using any appropriate object or accessory such as a finger or a stylus). The touch panel 2371 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 2311, and receives and executes a command sent by the processor 2311. In addition, the touch panel 2371 may be implemented in a plurality of forms, for example, a resistive, capacitive, infrared, or surface acoustic wave touch panel. The user input unit 2370 may further include the other input devices 2372 in addition to the touch panel 2371. Specifically, the other input devices 2372 may include but are not limited to a physical keyboard, a function key (such as a volume control key or a power on/off key), a trackball, a mouse, a joystick, and the like. Details are not described herein.

Further, the touch panel 2371 may cover the display panel 2361. After the touch panel 2371 detects a touch operation on or near the touch panel, the touch panel 2371 transmits the touch operation to the processor 2311 to determine a type of a touch event. Then the processor 2311 provides a corresponding visual output on the display panel 2361 based on the type of the touch event. Although the touch panel 2371 and the display panel 2361 are used as two independent components to implement input and output functions of the terminal in FIG. 23, the touch panel 2371 and the display panel 2361 may be integrated to implement the input and output functions of the terminal in some embodiments. This is not specifically limited herein.

The interface unit 2380 is an interface for connecting an external apparatus to the terminal 230. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 2380 may be configured to receive an input (for example, data information or power) from an external apparatus, and transmit the received input to one or more components in the terminal 230, or may be configured to transmit data between the terminal 230 and an external apparatus.

The memory 2390 may be configured to store a software program and various data. The memory 2390 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 23230 may include a high-speed random access memory, or may include a non-volatile memory, for example, at least one magnetic disk storage device, a flash memory, or other volatile solid-state storage devices.

The processor 2311 is a control center of the terminal. The processor 2390 uses various interfaces and lines to connect all parts of the entire terminal, and performs various functions and data processing of the terminal by running or executing the software program and/or module stored in the memory 2390 and invoking data stored in the memory 2390, thereby performing overall monitoring on the terminal. The processor 2311 may include one or more processing units. Optionally, the processor 2311 may integrate an application processor and a modem processor. The application processor mainly processes the operating system, a user interface, an application program, and the like. The modem processor mainly processes wireless communication. It may be understood that the modem processor may alternatively not be integrated into the processor 2311.

The terminal 230 may further include the power supply 2312 (for example, a battery) supplying power to all components. Optionally, the power supply 2312 may be logically connected to the processor 2311 through a power management system. In this way, functions such as charge management, discharge management, and power consumption management are implemented by using the power management system.

In addition, the terminal 230 includes some functional modules that are not illustrated. Details are not described herein.

Optionally, some embodiments of this disclosure further provide a terminal, including a processor 2311, a memory 2390, and a computer program stored in the memory 2390 and capable of running on the processor 2311. When the computer program is executed by the processor 2311, each process in the foregoing embodiment of the resource configuration obtaining method is implemented, with a same technical effect achieved. To avoid repetition, details are not described herein again.

Some embodiments of this disclosure further provide a computer-readable storage medium, where the computer-readable storage medium stores a computer program. When the computer program is executed by a processor, each process in the foregoing embodiment of the resource configuration obtaining method is implemented, with a same technical effect achieved. To avoid repetition, details are not described herein again. The computer-readable storage medium is, for example, a read-only memory (ROM), a random access memory (RAM), a magnetic disk, or an optical disc.

It can be understood that the embodiments described in some embodiments of this disclosure may be implemented by hardware, software, firmware, middleware, microcode, or a combination thereof. For hardware implementation, the module, unit, submodule, subunit, or the like may be implemented in one or more application specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this application, or a combination thereof.

For software implementation, the technologies described in some embodiments of this disclosure may be implemented by modules (such as processes and functions) that perform the functions described in some embodiments of this disclosure. Software code may be stored in the memory and executed by the processor. The memory may be implemented in or outside the processor.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should be further noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence. Some steps may be performed in parallel or independently.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing embodiments, a person skilled in the art may clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network-side device, or the like) to perform the method described in the embodiments of this disclosure.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

The invention claimed is:

1. A resource configuration method, applied to a first terminal and comprising:
    obtaining target configuration information; and
    determining sidelink resource configuration information based on the target configuration information;
    wherein the target configuration information comprises sidelink synchronization resource information; and the resource configuration method further comprises:
    determining a sidelink resource pool, wherein
    the sidelink resource pool does not comprise a sidelink synchronization resource indicated in the sidelink synchronization resource information;
    wherein the sidelink synchronization resource information comprises at least one of the following information:
    new radio (NR) sidelink synchronization resource information for transmitting or receiving an NR sidelink synchronization signal, wherein the NR sidelink synchronization resource information is indicated by a long term evolution (LTE) network-side device; or
    LTE sidelink synchronization resource information for transmitting or receiving an LTE sidelink synchronization signal, wherein the LTE sidelink synchronization resource information is indicated by an NR network-side device.

2. The resource configuration method according to claim 1, wherein the target configuration information comprises uplink-downlink configuration information; the sidelink resource configuration information comprises sidelink time domain resource configuration information; and the determining sidelink resource configuration information based on the target configuration information comprises:
    determining the sidelink time domain resource configuration information based on at least a part of resources that are indicated by the uplink-downlink configuration information and are usable for sidelink transmission.

3. The resource configuration method according to claim 1, wherein the target configuration information comprises uplink-downlink configuration information or sidelink time domain configuration information; and the obtaining target configuration information comprises at least one of the following manners:
    obtaining the target configuration information based on identification information corresponding to the target configuration information; or
    obtaining the target configuration information based on attribute information of the target configuration information,
    or,
    wherein the sidelink resource configuration information comprises sidelink time domain resource configuration information; and after the determining sidelink resource configuration information based on the target configuration information, the method further comprises at least one of the following manners:

sending a configuration identifier corresponding to the sidelink time domain resource configuration information; or sending attribute information corresponding to the sidelink time domain resource configuration information.

4. The resource configuration method according to claim 3, wherein the attribute information comprises at least one of the following information:
   a period;
   indication information of downlink resources;
   indication information of uplink resources;
   indication information of flexible resources;
   indication information of uplink resources and flexible resources;
   indication information of downlink resources and flexible resources;
   indication information of sidelink resources; or
   a numerical configuration.

5. The resource configuration method according to claim 1, wherein the target configuration information comprises uplink bandwidth configuration information or sidelink bandwidth configuration information; the sidelink resource configuration information comprises sidelink frequency domain resource configuration information; and the determining sidelink resource configuration information based on the target configuration information comprises:
   determining the sidelink frequency domain resource configuration information based on at least a part of resources in the target configuration information.

6. The resource configuration method according to claim 1, wherein the determining sidelink resource configuration information based on the target configuration information comprises:
   determining sidelink synchronization resource configuration information in the sidelink resource configuration information based on the sidelink synchronization resource information.

7. The resource configuration method according to claim 1, wherein the target configuration information further comprises at least one of following information:
   uplink-downlink configuration information, sidelink time domain configuration information, uplink bandwidth configuration information, sidelink bandwidth configuration information, or sidelink timing information.

8. The resource configuration method according to claim 1, wherein the target configuration information comprises uplink-downlink configuration information; and
   in response to that the first terminal is a long term evolution (LTE) sidelink user, the step of obtaining target configuration information comprises:
   receiving, by using another system information block (SIB) or radio resource control (RRC), uplink-downlink configuration information sent by an NR network-side device; or
   in response to that the first terminal is a new radio (NR) sidelink user, the step of obtaining target configuration information comprises:
   receiving, by using another SIB or RRC, uplink-downlink configuration information sent by an LTE network-side device.

9. The resource configuration method according to claim 1, wherein the determining sidelink resource configuration information based on the target configuration information comprises one of the following:
   determining the sidelink resource configuration information based on latest obtained target configuration information; and in response to that at least two pieces of target configuration information are obtained, determining the sidelink resource configuration information based on at least a part of information in the at least two pieces of target configuration information.

10. The resource configuration method according to claim 9, wherein the determining the sidelink resource configuration information based on at least a part of information in the at least two pieces of target configuration information comprises one of the following:
    determining the sidelink resource configuration information based on at least a part of resources in a union set of resources in the at least two pieces of target configuration information; and
    determining the sidelink resource configuration information based on first information in the at least two pieces of target configuration information, wherein
    the union set of resources comprises time domain resources usable for sidelink transmission in the at least two pieces of target configuration information; the first information is a piece of target configuration information that meets a preset condition in the at least two pieces of target configuration information; and
    the preset condition comprises: time domain resources usable for sidelink transmission are most, or time domain resources usable for sidelink transmission are fewest.

11. An information sending method, applied to a target device, wherein the target device is a network-side device or a second terminal, and the method comprises:
    sending target configuration information to a first terminal;
    wherein the target configuration information comprises sidelink synchronization resource information; and the information sending method further comprises:
    determining that the sidelink resource pool does not comprise a sidelink synchronization resource indicated in the sidelink synchronization resource information;
    wherein the sidelink synchronization resource information comprises at least one of the following information:
    new radio (NR) sidelink synchronization resource information for transmitting or receiving an NR sidelink synchronization signal, wherein the NR sidelink synchronization resource information is indicated by a long term evolution (LTE) network-side device; or
    LTE sidelink synchronization resource information for transmitting or receiving an LTE sidelink synchronization signal, wherein the LTE sidelink synchronization resource information is indicated by an NR network-side device.

12. The information sending method according to claim 11, wherein the target configuration information comprises uplink-downlink configuration information or sidelink time domain configuration information; and the sending target configuration information to a first terminal comprises at least one of the following manners:
    sending identification information corresponding to the target configuration information to the first terminal; or
    sending attribute information corresponding to the target configuration information to the first terminal.

13. The information sending method according to claim 12, wherein the attribute information comprises at least one of the following information:
- a period;
- indication information of downlink resources;
- indication information of uplink resources;
- indication information of flexible resources;
- indication information of uplink resources and flexible resources;
- indication information of downlink resources and flexible resources;
- indication information of sidelink resources; or
- a numerical configuration.

14. A resource configuration obtaining method, applied to a third terminal and comprising:
- receiving sidelink resource configuration information sent by a first terminal;
- wherein the sidelink resource configuration information is determined by the first terminal based on sidelink synchronization resource information, and a sidelink resource pool does not comprise a sidelink synchronization resource indicated in the sidelink synchronization resource information;
- wherein the sidelink synchronization resource information comprises at least one of the following information:
- new radio (NR) sidelink synchronization resource information for transmitting or receiving an NR sidelink synchronization signal, wherein the NR sidelink synchronization resource information is indicated by a long term evolution (LTE) network-side device; or
- LTE sidelink synchronization resource information for transmitting or receiving an LTE sidelink synchronization signal, wherein the LTE sidelink synchronization resource information is indicated by an NR network-side device.

15. The resource configuration obtaining method according to claim 14, wherein the sidelink resource configuration information comprises sidelink time domain resource configuration information; and the receiving sidelink resource configuration information sent by a first terminal comprises at least one of the following manners:
- receiving a configuration identifier corresponding to the sidelink time domain resource configuration information and sent by the first terminal; or
- receiving attribute information corresponding to the sidelink time domain resource configuration information and sent by the first terminal.

16. The resource configuration obtaining method according to claim 15, wherein the attribute information comprises at least one of the following information:
- a period;
- indication information of downlink resources;
- indication information of uplink resources;
- indication information of flexible resources;
- indication information of uplink resources and flexible resources;
- indication information of downlink resources and flexible resources;
- indication information of sidelink resources; or
- a numerical configuration.

17. The resource configuration obtaining method according to claim 14, wherein the receiving sidelink resource configuration information sent by a first terminal comprises:
- receiving the sidelink resource configuration information sent by the first terminal by using a first target message, wherein
- the first target message comprises at least one of a physical sidelink broadcast channel (PSBCH), a sidelink system information block (SIB), or sidelink radio resource control (RRC) signaling.

18. The resource configuration obtaining method according to claim 14, wherein the sidelink resource configuration information comprises at least one of following information:
- sidelink time domain resource configuration information, sidelink frequency domain resource configuration information, sidelink synchronization resource configuration information, or sidelink timing configuration information.

* * * * *